US008406478B2

(12) United States Patent
Chen et al.

(10) Patent No.: US 8,406,478 B2
(45) Date of Patent: Mar. 26, 2013

(54) DISTRIBUTED PROCESSING IN AUTHENTICATION

(75) Inventors: Tai Pang Chen, Singapore (SG); Wei Yun Yau, Singapore (SG)

(73) Assignee: Agency for Science, Technology and Research Nanyang Technological University, Singapore (SG)

( * ) Notice: Subject to any disclaimer, the term of this patent is extended or adjusted under 35 U.S.C. 154(b) by 1053 days.

(21) Appl. No.: 10/524,057

(22) PCT Filed: Aug. 8, 2002

(86) PCT No.: PCT/SG02/00199
§ 371 (c)(1),
(2), (4) Date: Dec. 29, 2005

(87) PCT Pub. No.: WO2004/019190
PCT Pub. Date: Mar. 4, 2004

(65) Prior Publication Data
US 2006/0129838 A1    Jun. 15, 2006

(51) Int. Cl.
*G06K 9/00*      (2006.01)
(52) U.S. Cl. ........ 382/115; 382/116; 382/125; 382/117; 382/118; 713/185; 713/186; 340/5.52; 340/5.53; 340/5.8; 340/5.81; 340/5.82; 340/5.83; 726/9; 726/20; 726/26; 726/27; 726/28
(58) Field of Classification Search .................. 713/186
See application file for complete search history.

(56) References Cited

U.S. PATENT DOCUMENTS

| | | | | |
|---|---|---|---|---|
| 6,003,135 | A | 12/1999 | Bialike | 713/201 |
| 6,219,439 | B1 | 4/2001 | Burger | 382/115 |
| 7,274,804 | B2 * | 9/2007 | Hamid | 382/115 |
| 2004/0034783 | A1 * | 2/2004 | Fedronic et al. | 713/186 |
| 2004/0122774 | A1 * | 6/2004 | Studd et al. | 705/65 |
| 2004/0215615 | A1 * | 10/2004 | Larsson et al. | 707/9 |
| 2005/0235148 | A1 * | 10/2005 | Scheidt et al. | 713/168 |

FOREIGN PATENT DOCUMENTS

| | | |
|---|---|---|
| GB | 2331825 A1 | 6/1999 |
| JP | 11 161793 | 6/1999 |
| JP | 2001188884 | 7/2001 |
| JP | 2001236324 | 8/2001 |
| WO | WO 01 11577 A1 | 2/2001 |
| WO | 0142938 | 6/2001 |

OTHER PUBLICATIONS

XD Jiang, WY Yau, "Fingerprint Minutiae Matching Based on the Local and Global Structures", 15th International Conference on Pattern Rechgnition, Proc. ICPR 2000, pp. 1038-1041, Barcelona Spain, Sep. 2000.

* cited by examiner

*Primary Examiner* — Nathan Flynn
*Assistant Examiner* — Bryan Wright
(74) *Attorney, Agent, or Firm* — K. David Crockett, Esq.; Paul J. Backofen, Esq.; Crockett & Crockett, PC

(57) ABSTRACT

Identity authentication systems and techniques are disclosed which solves the problem associated with limited processing power and smart card technology in the handling of biometric authentication. By distributing the processing of an identity authenticating process between a smart card and a computer terminal, the complicated calculation involved in a biometrics matching process can be carried out to allow verification using biometric parameters stored on smart cards. There is disclosed a system and technique for user authentication, together with a system and technique for distributed processing. A registration method is also described.

54 Claims, 14 Drawing Sheets

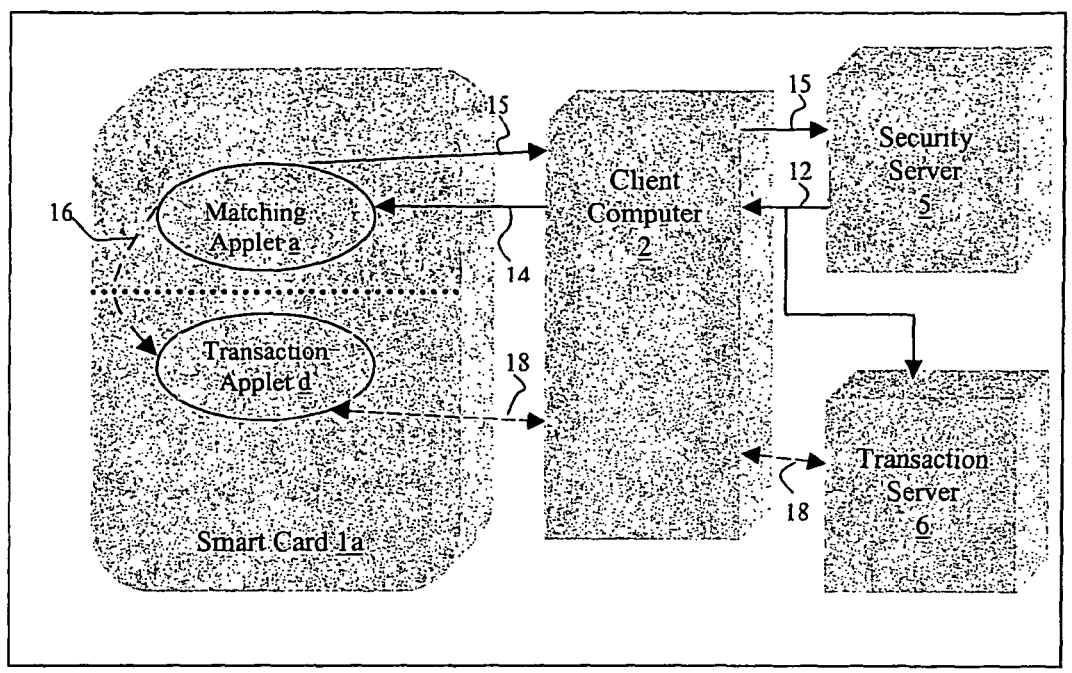
Figure 3.
Figure 4: SACK Format

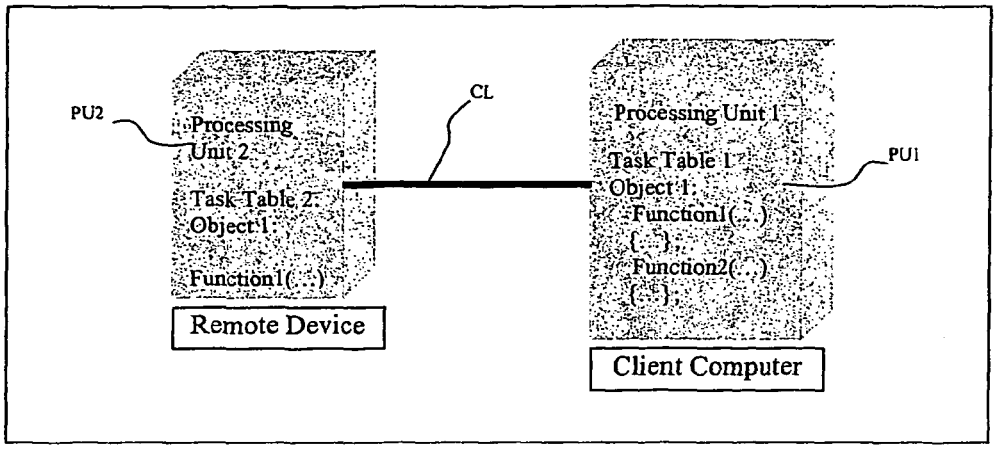

Figure 5.

| Object Name | Object ID | Parameters | Entry Point |
|---|---|---|---|
| Object1 | Object1 ID | void | *Object1 |
| Function1 | Function1 ID | (int)P1,(int)P2 | *Function1(..) |
| Function2 | Function2 ID | (float)P1 | *Function2(..) |
| Function3 | Function3 ID | void | *Function3(..) |
| Function4 | Function4 ID | (bool) P1, (bool)P2 | *Function4(..) |
| ..... | ..... | ..... | ..... |
| FunctionN | FunctionN ID | void | *FunctionN(..) |
| Object2 | Object2 ID | (byte) P1 | *Object2 |
| Function5 | Function5 ID | void | *Function5(..) |
| Function6 | Function6 ID | void | *Function6(..) |
| Function7 | Function7 ID | void | *Function7(..) |
| Function8 | Function8 ID | void | *Function8(..) |
| ..... | ..... | ..... | ..... |
| FunctionN | FunctionN ID | Void | *FunctionN(..) |
| EOT | EOT | EOT | EOT |

Figure 6.

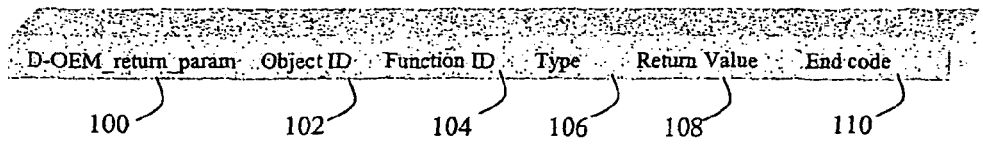
Figure 10
| Object ID | Function ID | Reference of the return object |
|---|---|---|
| OID1 | FID1 | (int*) result |
| OID2 | FID2 | (float*) result2 |
| OID3 | FID3 | (double*) coef |
| ... | ... | ... |
| OIDN | FIND | (int**) array |
Figure 11
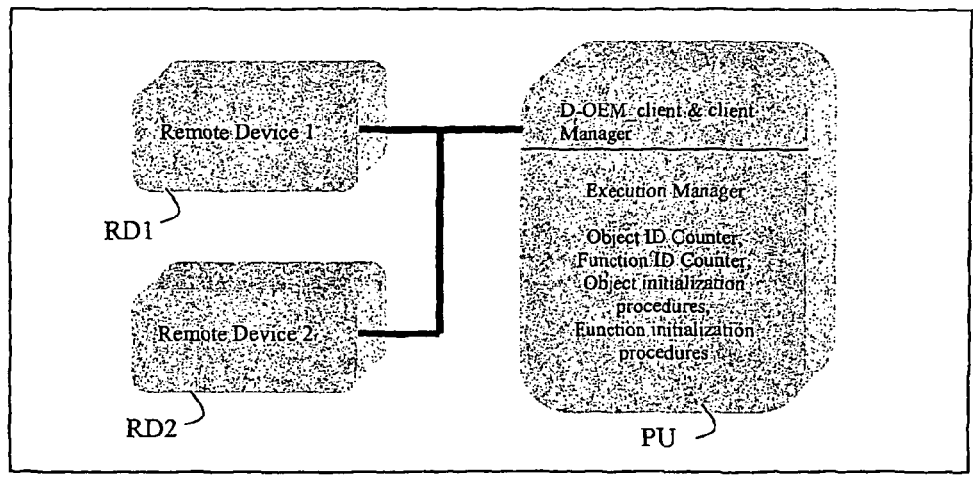
Figure 12
Figure 13

| Object Name | Object ID | Address |
|---|---|---|
| Object1 | Object1 ID | www.csp.ntu.edu.sg:1080 |
| Function1 | Function1 ID | www.csp.ntu.edu.sg:1080 |
| Function2 | Function2 ID | www.csp.ntu.edu.sg:1080 |
| Function3 | Function3 ID | www.csp.ntu.edu.sg:1080 |
| Function4 | Function4 ID | www.csp.ntu.edu.sg:1080 |
| Object2 | Object2 ID | 131.120.12.1:70 |
| Function1 | Function1 ID | 131.120.12.1:70 |
| Function2 | Function2 ID | 131.120.12.1:70 |

Figure 19
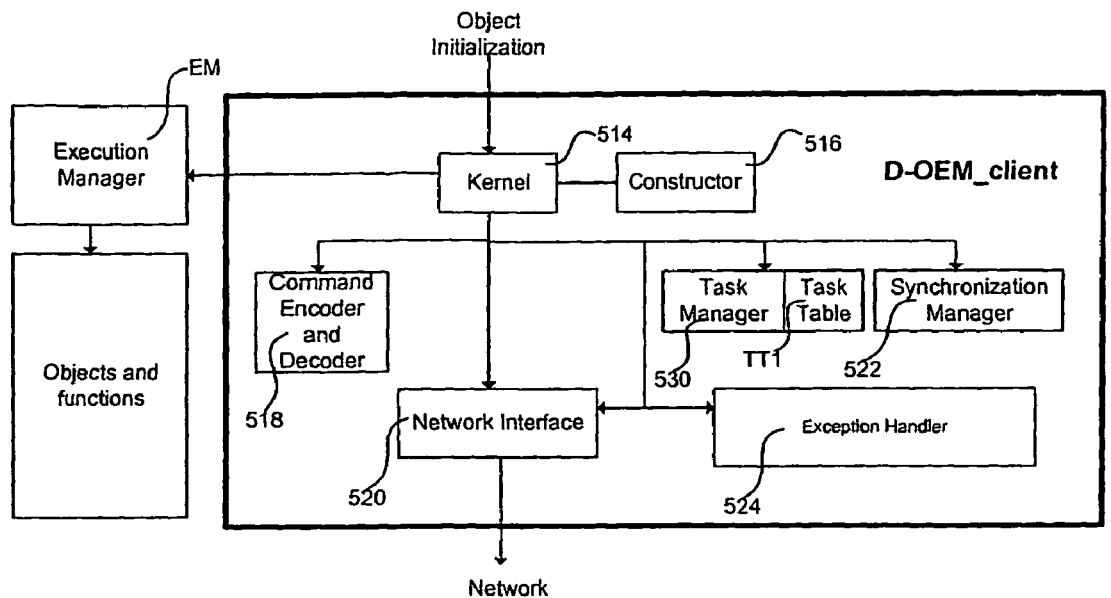
Figure 20
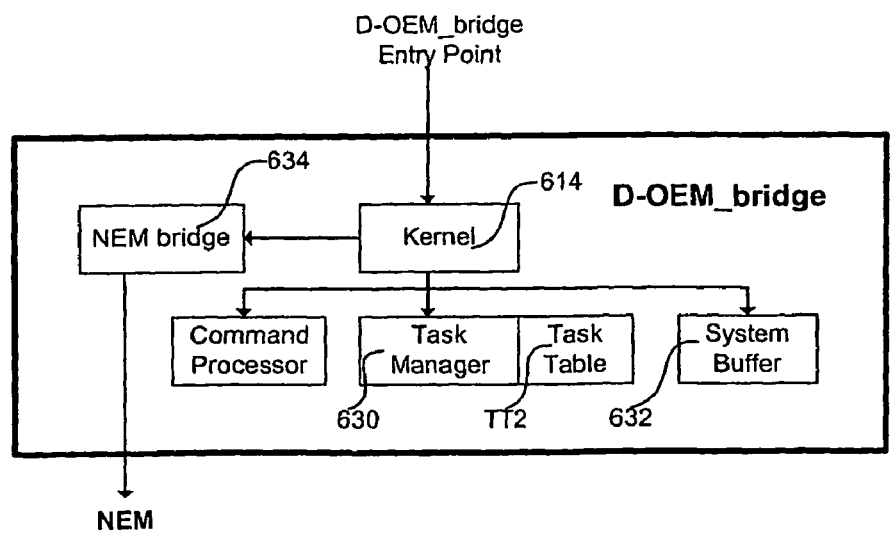
Figure 21

DISTRIBUTED PROCESSING IN AUTHENTICATION

In an electronic or other remote transaction, identifying the real user is difficult as there is no actual contact. For example, if one would like to purchase anything over the Internet, most likely a credit card number is required but it is not necessary to physically produce the card for verification. However, such a number can be obtained rather easily by hackers, not to mention the numerous fake credit cards in circulation. Bankcards need PIN (Personal Identification Number) numbers to authenticate the identity of the user. However, in many situations, the PIN numbers can be obtained easily either because the users wrote the PIN on their cards or at some other associated place or because the PIN numbers were obtained through fraudulent means. Some customers have more than one bank account and thus it is challenging to remember all the various PIN numbers on top of the various PINs/passwords used daily. The most important problem of mobile or electronic commerce is how to identify the "real" customer without resorting to any complex and troublesome mechanism for verification. Biometrics is one of the best candidates to solve this problem.

Smart cards are becoming a popular feature for e-commerce transaction nowadays because they are small, portable and contain a secure computing platform. The conventional way of using a smart card is just to store and verify user's PIN on card. For example the Subscriber Identity Module (SIM) card which is a form of smart card used in the GSM mobile phone is used to store the user's PIN number and some access security code to mobile stations. It also verifies the PIN number as well.

It would be desirable to utilize smart card technology to handle biometric authentication, that is to allow user biometrics data to be used for authentication instead of or in addition to a personal identification number. The difficulty with using smart cards arises in the limited processing power and memory available on the smart card whereas authentication techniques using biometric data frequently require extensive processing power. A similar situation is faced by any general portable secure computing and data storage platform including Universal Serial Bus (USB) token, contactless card, multimedia card, memory stick, secure processor chip and smart watch.

U.S. Pat. No. 5,767,504 describes a smart card with plurality of zones for verification and validation. The zones are formed by counters and certificates and not related to biometrics template.

U.S. Pat. No. 6,012,049 describes a smart card for financial transaction system. The access to the records stored in the smart card is divided into hierarchy of 3 or more levels. It is recognized that the system can incorporate biometrics and PIN for verification but these are done at the smart card reader level.

U.S. Pat. No. 6,052,690 describes an invention of coherent data structure with multiple interaction contexts for a smart card. The technique introduced is suitable for separate execution environment in the smart card and introduced methods to share resources as well as defining multiple access conditions for shared data by multiple applications. However, the operations are limited by the processing power of the smart card and does not attempt to acquire additional resources externally.

U.S. Pat. No. 6,157,966 describes a smart card connected to a terminal, which is in turn connected to a host computer and/or a network. The smart card is configured to initiate communications with the terminal, which enables the smart card to control the terminal, host computer, or network and to access the resources connected to the terminal, host computer, or network. A communications protocol defines the commands that the smart card can send and allows the smart card to communicate using asynchronous or logical asynchronous communication. As the communication speed is slow, such an approach is not suitable for execution of computationally-intensive task involving lots of commands.

U.S. Pat. No. 6,182,892 describes a fingerprint authentication methodology in which a smart card with a credit card form factor is used to transmit the imprint of a fingerprint to a live-scan device. The smart card is mainly used to store the fingerprint with little mention of the processing aspect of it.

U.S. Pat. No. 6,199,114 describes methods and systems to initiate a user session at an internet terminal using a smart card. The internet terminal is coupled to a server system. The internet terminal detects the presence of a smart card in which is stored a unique smart card identifier and uses the identifier to locate the configuration information associated with a particular user of the server. The configuration information may include a defined customer environment or customer preferences for customizing the operation of the internet terminal such as the type of on-screen keyboard presented by the internet terminal, the font used by the internet terminal for displaying text, background music options, and e-mail options. It is not related to the smart card security and identity authentication.

U.S. Pat. No. 6,226,744 describes a method and apparatus for authenticating a user over a network, with the network having a client computer and a server computer, and the client computer having a smart card and a smart card reader. The client sends a request to the server to access restricted information stored by the server. The server sends a smart card interface module to the client. The server requests an access code from the user to access the smart card. Once the server receives the access code, the server accesses user information stored on the smart card utilizing the program and the access code. The server compares the user information with authentication information available to the server but not the client. If the user information matches the authentication information, the server grants the client access to the restricted information. The access code is not part of biometrics and does not involve processing of the biometrics information.

It is an aim of one aspect of this invention to increase the security of identity authentication using biometrics and having the processing done at a user presented device such as a smart card.

It is an aim of another aspect of this invention to solve the problem associated with limited processing power of smart cards to handle biometric authentication.

It is an aim of yet another aspect of the invention to provide a technique for distributing processing of tasks across more than one processor, to allow a superior processing power of one of the processors to be used to advantage.

According to one aspect of the present invention there is provided a method of authenticating a user according to a biometric parameter of the user presented at an authentication device on a user-presented device on which is stored a biometric identification template divided into a secure portion and an open portion, the method comprising:

transmitting to a client terminal data derived from said user biometric parameter at the authentication device;

transmitting to the client terminal only the open portion of the said biometric identification template held on the user-presented device; at the client terminal, implementing a first stage of an identity authentication process between said data and said portion and transmitting the results of said authentication process to the user-presented device; and at the user-presented device implementing a second stage to complete the identity authentication process using said results and issuing an authentication result based thereon.

The results of the first stage can be transmitted to the user-presented device either directly or via the authentication device.

Another aspect of the invention provides a system for authenticating a user according to a biometric parameter of the user, the system comprising: a user-presented device on which is stored a biometric identification template divided into a secure portion and an open portion, wherein only said open portion can be transmitted out of the said device; an authentication device operable to read biometric data derived from a user, and comprising means for communicating with the user-presented device and a client terminal; a client terminal arranged to receive the said open portion of the biometric[s] identification template held on the user-presented device and the biometric data derived from the user, and comprising a client processor operable to implement a first stage of and identity authentication process between said data and said portion and to transmit the results of said identity authentication process to the user-presented device, and wherein the user-presented device comprises a device processor operable to implement a second stage to complete the identity authentication process using said results and to issue an authentication result based thereon.

The authentication device and the user-presented device can be physically separate devices or as a single physical unit, in which the user-presented device is only a process or an internal special portion of the single device which is capable of high-security processing and is separated from the general processing unit which forms the authentication device. For example, it can be an ASIC chip in which the user-presented device is a secure processor module while the rest of the chip is the authentication device.

The client terminal and the authentication device can also be separate devices or a single physical unit if the authentication device has sufficient processing and memory resources. In the latter case, there is no distinction between the client terminal and the authentication device.

A further aspect of the invention provides a method of registration of a user according to a biometric parameter of the user presented at an authentication device, the method comprising: transmitting to an authorized client terminal data derived from said user biometric parameter obtained at the authentication device; at the authorized client terminal, dividing the biometric identification template computed into secure portion and open portion, transmitting from the authorized client terminal to a user-presented device both the open portion and the secure portion of a biometric identification template, storing the said template consisting of open and secure portions on the user-presented device, with the secure portion only accessible within the user-presented device and not externally.

The particular biometric parameter discussed herein is a fingerprint, but it will be appreciated that the invention can be applied to any suitable biometric parameter. In addition, the particular user-presented device discussed herein is a smart card, but it will be appreciated that the invention can be applied to any general portable secure computing and data storage platform.

A further aspect of the invention provides a method of executing an operation using first and second processors, the method comprising: storing in the first processor a first task table containing a plurality of process names with associated process identifiers, each associated with a process locator; storing in the second processor a second task table containing said process names and process identifiers; identifying at the second processor a process to be executed and issuing a request to the first processor to execute said process; locating said process using the process locator and executing said process at the first processor to generate a result; and returning the result to the second processor.

A still further aspect of the invention provides a processing system comprising: a first processor in which is stored a first task table containing a plurality of process names and process identifiers, each associated with a process locator; a second processor in which is stored a second task table containing said process names with associated process identifiers; the second processor including a distributed object execution manager for identifying a process to be executed and issuing a request to the first processor to execute said process; and the first processor including a client distributed object execution manager for controlling the execution of said processes at the first processor, the results of execution of the processes implemented at the first processor being returned to the second processor.

The present invention is useful where the second processor has significantly less processing power than the first processor, or where the second processor is using its processing power for other applications and the first processor is secure and trusted.

A particular application of these aspects of the invention allows a fingerprint authentication process to be distributed across a client terminal and a smart card.

Thus, the embodiments of the invention discussed in the following solve the problem associated with limited processing power of smart card technology in the handling of biometric authentication. Currently, smart cards have limited RAM (less than 2 k bytes), EEPROM (less than 64 k bytes) and processing power. By using the PC as a co-processor to handle the complicated calculations involved in part of the fingerprint matching process, verification using biometric parameters stored on smart cards is possible. There are described in the following secure authentication protocols to protect electronic or mobile commercial transactions. It will be appreciated that the whole scheme can be applied to any portable computing device for performing secure authenticated transactions.

In the described embodiments, the security of the system is increased because the complete fingerprint template (or other biometric template) stored in the smart card is not transmitted from the smart card. In the preferred embodiment, the identity of the user is communicated to the external world in the form of a unique personal identification number that incorporates the results of biometric matching.

In particular, the following elements are discussed in more detail in the specific description of the preferred embodiments which follow by way of example.

Protocols

A secure fingerprint matching protocol has been developed to transmit a portion of the fingerprint template from a smart card to a client terminal. It avoids the need to transmit the whole template from the smart card to the PC, which could constitute a security risk by revealing the person's fingerprint template. The fingerprint template in the smart card is divided into secure portion and open portion. The secure portion will always reside in the smart card at any circumstances. Only the open portion of the fingerprint template is transmitted from the smart card to the client terminal, and the open portion of the template which is transmitted is not enough to construct a fake template to gain access of the smart card.

Also, a secure fingerprint-smart card enable transaction protocol is discussed which protects against any intruder attempts to hack into a transaction server for illegal access. The smart card becomes a physical key for the transaction since all the transactions need to go through the fingerprint enable transaction applet which is stored on the smart card.

Load Sharing

By distributing the fingerprint authentication processing across the processor of the smart card and the processor of the client terminal, the load on the smart card is reduced. Therefore it is not necessary to use a smart card with powerful computational resource which can be expensive to perform on-card matching with a high accuracy of verification. Also, it can be ensured that the client terminal is trusted and secure and the codes performing the fingerprint authentication processing are secured.

User Identification Number

A unique user identification number that is capable of changing every time it is used is provided. A user does not have to remember the identification number. Instead only the system of the issuing company and the smart card of the user has a copy of the user identification number. The user relies on another personal identification number or biometrics data to synthesise a user identification number to determine the granting of access to a transaction.

Distributed Remote Execution Manager Protocol

This protocol allows concurrent processing of an operation to be implemented across first and second processors, in particular a smart card and a client terminal. This overcomes the problem of a smart card or other mobile device having limited processing power which would mean that some computationally intensive techniques such as fingerprint matching would take too long to execute on a smart card. Load sharing with a client terminal with more computing power speeds up the process. The protocol can be implemented not only on smart cards but on any device with limited processing power including personal digital assistants.

For a better understanding of the present invention and to show how the same may be carried into effect, reference will now be made by way of example to the accompanying drawings in which:

FIG. 3 is a schematic block diagram of the message flow for performing a business transaction;

FIG. 4 illustrates the format of a security access check key;

FIG. 5 is a simplified architecture diagram of multiple processing units;

FIG. 6 illustrates a task table;

FIG. 10 shows the format of a return parameter;

FIG. 11 shows the format of the stack;

FIG. 12 is a schematic diagram of multiple remote devices with a single client processor;

FIG. 13 shows the encoding format for object and function IDs;

FIG. 20 is a block diagram of a distributed object execution manager in a client terminal;

FIG. 21 is a schematic block diagram of a distributed object execution manager in a bridge.

Figure 1:
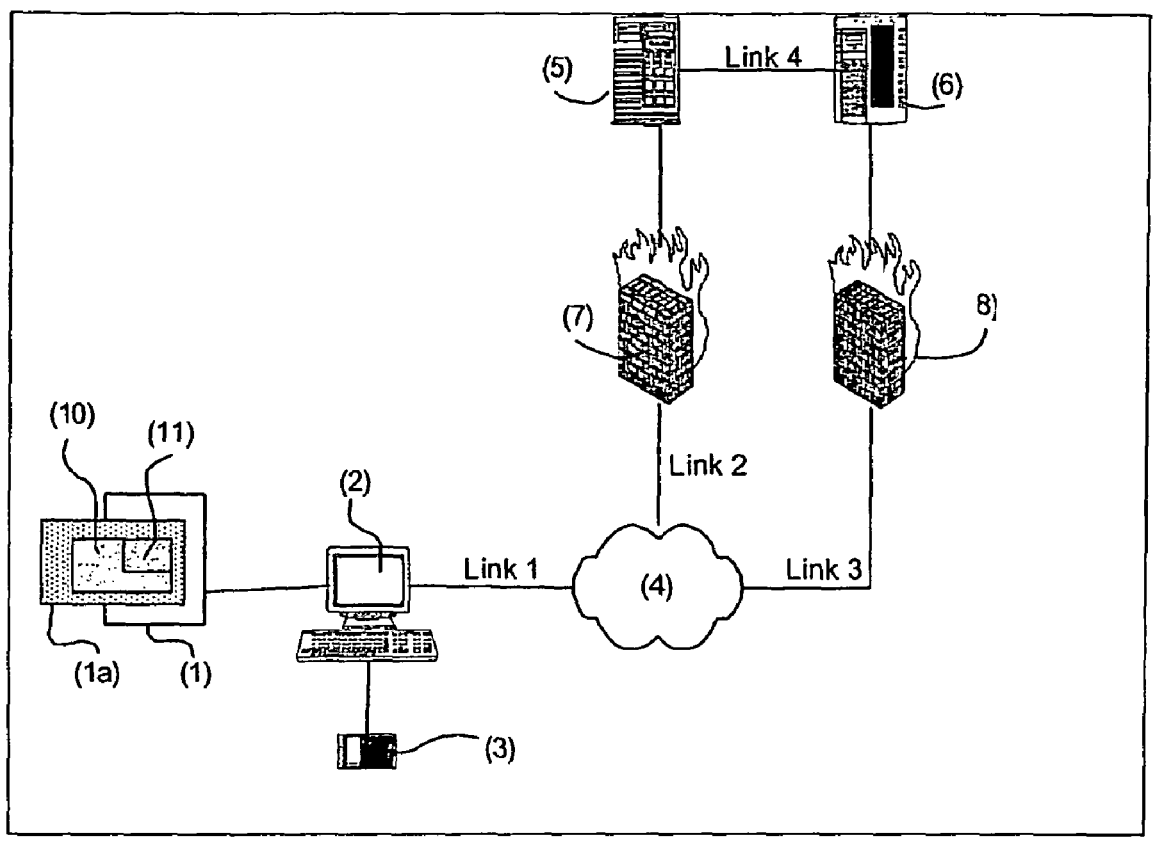
FIG. 1 is a schematic diagram of an authentication system.

The follows a description of a scheme for secure electronic and mobile commerce transactions. FIG. 1 shows the connections of the components in one embodiment. The scheme consists of a smart card reader 1, local client computer 2, a network connection 4, a security server 5 and a transaction server computer 6. Before the discussion of the method of transaction, we will define all the items involved and the terms used. The smart card reader 1 is a hardware device for communication between the smart card 1a and the local client computer 2. The local client computer 2 is the terminal for the user to connect to the server 6 to perform a transaction. The terminal 2 can be a PC, PDA or handheld computer that has built-in communication devices. The network connection 4 is the method of communication between the client 2 and server 6, and comprises a connection Link 1 which can be a wireless or wired connection that provides communication on a Local Area Network or Wide Area Network 4 basis. Wireless connection can be either using the GSM, IEEE 802.11b wireless LAN, Bluetooth or IrDA infrared data communication standard. Wired connection can be using the Ethernet, RS-232C, IBM token ring etc. The security server 5 secures the transaction server 6 from intruders and manages the user's portfolio. The transaction server 6 is the server that performs all the actual business transactions. The location of the transaction server 6 can be behind the Security server 5 which is guarded by the security server's firewall 7 or a separate server 6 which is guarded by local firewalls 7 and 8. The details of how to enable the firewall will be discussed later. The smart card reader 1 is connected to the local client computer 2, such as via standard RS-232C or USB link. That link itself does not have any data encryption. The smart card 1a and the client computer 2 do the encryption to conceal information. The smart card 1a in the present embodiment comprises Java Card, a type of smart card which can execute Java Byte Codes. With reference to FIG. 1A the smart card 1a has a memory 10 storing the following information:

(a) Local-matching applet
(b) Client-matching applet
(c) URL (Uniform Resource Locator) of the security server
(d) Transaction applet
(e) Security applet for comparing SACKs The memory 10 also holds a fingerprint identification template 11 of the authorised user of the smart card. The smart card 1a also has a processor 13 for executing code on the smart card 1a.

The local-matching applet (a) is a compact executable program such as the Java Byte Code that can run on smart card 1a. The client-matching applet (b) is another complimentary executable program such as the Java Byte Code that can execute in the client computer 2. The client-matching applet (b) can be stored in the smart card's memory 10. However, for some smart cards with limited memory, the size of the client-matching code may be too large. Instead, the URL (c) of the security server where the code for the client-matching applet can be obtained is provided. A URL (c) is necessary for the client to access the Internet to reach the server and download the code. No matter where the client downloads the client-matching code, the client should always check the integrity of the Java Byte code. The Transaction applet (d) performs actual business transactions. The only way of enabling this transaction applet is by a local-matching applet. As described in more detail later, once the local matching applet has verified the user's fingerprint is valid, it will send a security enable code to the internal firewall of the smart card to allow the transaction server 6 to do a business transaction. The details of how the transaction server 6 performs a business transaction will be discussed later.

A fingerprint sensor 3 captures the image of the fingerprint and sends it to the client computer 2. The client computer 2 processes the image and constructs a fingerprint template. The fingerprint template contains crucial information of the fingerprint features that allow unique recognition of the fingerprint. The client-matching applet (b) and the local-matching applet (a) compare the template from the sensor 3 and the template 11 stored on smart card 1a. The result of the comparison yields a similarity level, which indicates the degree of match between the fingerprint templates, one obtained live from the fingerprint sensor 3 and the other stored in the smart card 1a.

Link 1 is the wired or wireless connection to the LAN and WAN 4. The LAN and WAN 4 connect to servers 5, 6 through the firewall 7, 8. The security server 5 and transaction server 6 can be implemented in the same server machine or in different machine. If both servers are installed in the same machine, only one firewall is necessary. Otherwise, each server should have its own firewall. Link 4 is the optional network connection between the security server 5 and transaction server 6. If both servers are in the same sub-net in the LAN 4 and trust relationship has been established, the communication can be a direct connection via LAN 4. However, where information may go through the WAN 4, encryption and error detection schemes are necessary to avoid any information exposure and communication error respectively.

The client computer 2 accesses the security server 5 and gets all the necessary components for identity verification. The client-matching applet (b) can be downloaded from the security server or from the smart card 1a to the client computer 2. Once the client computer 2 has all fingerprint detection and matching components, user can proceed to choose the combination of the verification.

1) Fingerprint Only
2) PIN (identification number or password) only
3) Fingerprint+PIN
4) Other Biometric only
5) Other Biometric+Fingerprint
6) Other Biometric+Fingerprint+PIN Other biometrics can be hand written recognition, face recognition, retina scan or other suitable biometric identifiers. The transaction server 6 can adjust a confident index based on the chosen combination, so as to control the limitation of the access of the user to perform transaction. The issuer can assign an accuracy level for each type of biometric. The following equation is an example for calculating the matching score using confident index for the case where fingerprint and PIN are used.

$$CI = FM*K_1 + PIN \quad \text{----} \quad (1)$$
CI: Confident Index
FM: Fingerprint Matching Score (from 0 to 100)
$K_1$ : Coefficient
PIN: PIN score.

The PIN score is either 50 (correct PIN) or 0 (Incorrect PIN). If $K_1$ equals to 0.5, the range of CI will be from 0 to 100. For low security applications, the threshold score can be set to lower than 50. Hence, the user who can access to the system has either a correct PIN or valid fingerprint. For high security applications, the threshold can be adjusted to greater than 50. In this case, the user should have both valid fingerprint and PIN number in order to access the transaction server 6.

Registration

Before the user can use the smart card to perform verification, the user should register the fingerprint on the smart card. FIG. 1 shows the system of performing transaction and fingerprint authentication. Registration does not involve any transaction. Hence, link 3 to the transaction server can be removed. Smart card reader 1, smart card 1a, a client terminal 2 and a fingerprint sensor 3 are necessary for registration. The connection to security server is necessary as well, since the security server should record down the information of the new user. An authorized client terminal 2 must be used for secure registration. The user presents the fingerprint on the fingerprint sensor. The sensor captures the biometric parameter and transmits the parameter to the client terminal 2. The client terminal 2 constructs a fingerprint template with two portions, secure portion and open portion. The client terminal 2 uploads both portions of template to the smart card 1a. The secure portion which contains crucial information is stored in the user-presented device and this portion will never be sent out from the device. The open portion which contains less crucial information is stored as a compressed form on the smart card 1a. Once the client terminal 2 completes the processing of the template which consists of open portion and secure portion, it will upload the information of the user to both the smart card 1a and the security server 5 for recording purpose.

Protocol for Fingerprint Matching on Smart Card.

The fingerprint matching algorithm as disclosed in XD Jiang, WY Yau, "Fingerprint Minutiae Matching Based on the Local and Global Structures", 15th International Conference on Pattern Recognition, Proc. ICPR 2000, Barcelona, Spain, September 2000 is suitable for use in this scheme. The algorithm is divided into two stages—the local stage and the global stage. The local stage uses a subset of fingerprint minutiae (which is the open portion mentioned earlier) to establish the correspondence between the minutiae in the user-presented fingerprint and the stored template 11. Once sufficient correspondence is found, a transformation function that maps the minutiae in the user-presented fingerprint to the subset of minutiae of the stored template will be computed. This transformation function then aligns the two templates using the minutiae. Global matching is then performed to ascertain the degree of confidence that the query fingerprint is similar to the registered fingerprint. Such an algorithm is naturally suited for distributed or client-server processing. As mentioned in the previous section, the finger matching process is divided into two sides: smart card 1a side and the client computer 2 side. Both sides work in tandem to perform the matching process. The client computer 2 computes all pre-processing parameters and re-aligns the templates from both the client computer 2 side and the smart card 1a side. Then the client computer 2 passes it to the smart card 1a to perform the final matching. The reasons for matching a fingerprint template in such a way are:

1) Better authentication security because the original enrolled template 11 is never revealed to the public, but only a subset of the minutiae.
2) Increase the speed of matching by using the client computer 2 processing power to augment the processing power of a smart card 1a processor which is very limited.
3) Because of the inherently high security nature of smart card 1a, hacker can never use any software method to view the matching program residing in the smart card 1a.

Figure 2:
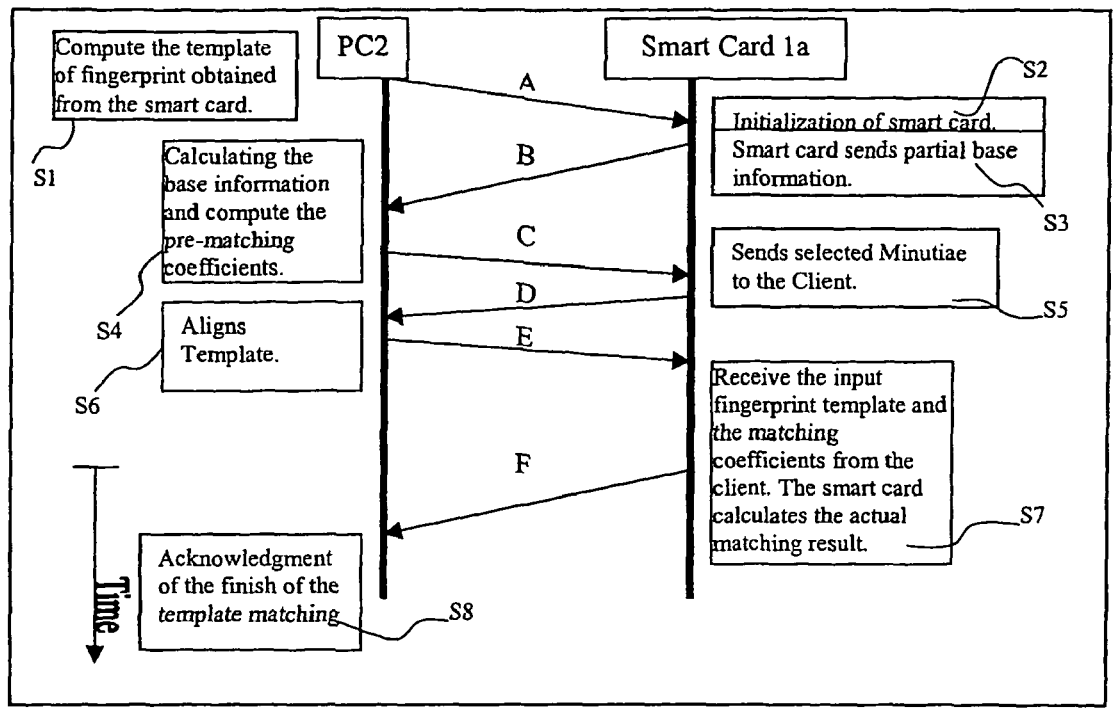
FIG. 2 is a dataflow diagram of implementing matching shared between client terminal and a smart card.

FIG. 2 shows the procedures of performing matching on smart card 1a. All arrows indicate the direction of data flow. The description of each arrow is stated below:

A) Client computer 2 (PC) computes the template of the fingerprint obtained from the fingerprint sensor 3 (Step S1).

B) After initialization (Step S2), smart card 1a sends partial base information of minutiae (Step S3) for the PC to calculate the matching coefficients (encrypted information) (Step S4).

C) PC requests the coordinate of maximum of nine potential minutiae from the smart card 1a. These minutiae are used to align the two templates so that they are in the same coordinate space.

D) Smart card 1a sends encrypted coordinates of minutiae (maximum nine minutiae) to PC (Step S5).

E) PC aligns templates (Step S6) and sends the aligned input fingerprint template and matching coefficients to smart card 1a.

F) Smart card 1a receives the template and matching coefficients, calculates a matching result (Step S7) and sends an acknowledge signal to PC, which acknowledges finish of template matching (Step S8).

Since the remote computation (i.e. at the client terminal 2) is only used to align the two sets of minutiae, does not have even the full minutiae information of the maximum nine minutiae for alignment and does not affect the actual global matching process itself, thus the proposed distributed processing will not compromise the security of the fingerprint matching in any way.

Fingerprint-Smart Card Enabled Transaction Protocol.

Once the smart card 1a has finished the calculation of the matching result, the smart card 1a notifies the security server 5 through the client computer 2 by an acknowledge signal and requests a Security Access Check Key (SACK) from the server 5. The SACK is used to allow the matching applet (a) to activate the transaction applet (d) on the smart card 1a. The SACK code is a UIN (Unique Personal Identification Number) with a time stamp. The details of the SACK key will be discussed later. FIG. 3 shows the message paths of how the system performs the transaction. The following sequence shows the method of using the SACK to enable the transaction applet (d).

(1.1) Matching applet (a) notifies the security server 5 that the matching process has been finished (path 15).

(1.2) The security server 5 sends a SACK key to the matching applet (a) on the smart card 1a (path 12) and the transaction server 6 as well.

(1.3) Once the matching applet (a) receives the SACK (path 14), it will add the matching score to the SACK (equation 2 below).

(1.4) The matching applet (a) transmits the SACK to the transaction applet (d) internally (path 16).

(1.5) The transaction applet (d) decodes the SACK to check the matching score. If authentication is successful (i.e. the score is higher than the security threshold), the applet (d) will switch itself to transaction-enabled status, otherwise (i.e. the score is lower than the security threshold), the transaction applet (d) will disable itself immediately and it notifies the card manager to handle the security exception. Path 18 is the message path to perform the transaction.

$$SACK_{Matching\ applet}::UIN = SACK_{Security\ Server}::UIN + Matching\ Score \quad (2)$$

Note: the notation of '::' means the member of. Therefore, $SACK_{Matching\ applet}::UIN$ means the UIN field of the $SACK_{Matching\ applet}$.

Up to this point, all security-enabled procedures for the transaction applet (d) have been done inside the core of the smart card 1a, except for the SACK key that is issued by the security server 5. The external client computer 2 only performs some assistance for the computation of matching. The final matching result, security-enable code and transaction applet (d) activation are done on the smart card 1a; none of this information is sent out to the client computer 2. The role of the client computer 2 is just a communication bridge between the server and the smart card 1a, and as a co-processor for the smart card 1a. The final decision still depends on the matching result on the smart card 1a. If the security applet (e) in Procedure (1.5) disables itself and causes a security exception, the applet (e) will notify the card manager to handle the security exception. The card manager disables all transactions to the security applet (e) and it reports to the client computer 2 by throwing a security exception. Of course, the client computer 2 has the capability to handle the exception. If client computer 2 receives the exception from the smart card 1a, the client computer 2 will execute the security exception handling routine to report to the user as well as the transaction server 6 of such error. The transaction server 6 terminates the transaction and it reports to the administrator for further instruction.

Once the transaction applet (d) has been enabled, the transaction server 6 will perform a business transaction. For example, the user wants to pay $100 to a credit card company. The following procedures can be used to perform a business transaction. Bi-directional communication channels (path 18) will be established for the transaction.

(2.1) The client computer 2 sends the purchase-request and the amount of transaction ($100) to the transaction server 6 via path 18. The client computer 2 also sends the amount of transaction to the smart card 1a as well.

(2.2) The transaction server 6 sends a SACK key with a new time stamp to the smart card 1a.

(2.3) The transaction applet (d) of smart card 1a compares the SACK keys and checks the time stamp (one is from the matching applet and the other one is from transaction server 6).

(2.4) If both keys are the same and the time stamp is within the time limit, the applet (d) will deduct the value from the smart card 1a ($100). Then, the applet (d) notifies the transaction server 6 that the transaction has been successfully completed.

(2.5) If both keys are invalid or the time stamp is out of the time limit, the transaction applet (d) sends a transaction-failed message. The transaction server 6 aborts the transaction and it notifies the administrator immediately.

(2.6) If the transaction receives the transaction-successful message from the smart card 1a, it will proceed to run the actual transaction with the credit card company to deposit $100 to the account of credit card company. At this moment, the user has paid $100 to the credit company by way of an electronic transaction.

In procedure (2.2), the SACK key, in fact, is the one from the security server 5 as mentioned earlier. The only difference is that it has a new time stamp but without the matching score. In procedure (2.3), the method of verifying the SACK keys is by testing the UIN field from the SACK. Since both keys are from security server 5, they should have the same UIN key except the matching score. Hence, the method of verifying the UIN key is:

$$SACK_{Matching\ applet}::UIN - SACK_{Transaction\ Server}::UIN = \text{Matching Score} \quad (3),$$

if so $$SACK_{Transaction\ Server}::UIN = SACK_{Security\ Server}::UIN \quad (4)$$

The transaction applet (d) on the smart card 1a performs subtraction of both keys. The result should be the matching score. Otherwise, either one of the keys or both keys are invalid. The time stamp field indicates the time of login or performing transaction. Equation 5 calculates the duration of the time between login and transaction.

$$\text{Duration} = SACK_{Transaction\ Server}::\text{TimeStamp} - SACK_{Matching\ Applet}::\text{TimeStamp} \quad (5)$$

If the duration between the login time ($SACK_{Matching\ applet}$::TimeStamp) and the transaction time ($SACK_{Transaction\ Server}$::TimeStamp) is longer than the time limit (e.g. 5 minutes), the transaction applet (d) aborts the transaction and it sends an error message back to the transaction server 6. In this case, user needs to login again in order to continue the transaction.

Unique personal Identification Number and the SACK

Since the SACK is the key for permitting the security applet (e) to enable the transaction applet (d), it is a unique key of allowing the transaction applet (d) to perform transaction. To achieve this, a unique personal identification number (UIN) is proposed here as well.

For each person, a Unique personal Identification Number (UIN) is assigned to him, but he will not know nor has he to remember the UIN. The UIN will be randomly generated. It is also possible for the UIN to incorporate a number which can identify the issuing company and the biometric system in use. In addition, a biometrics of the person is obtained, such as his fingerprint. As already explained, the person can use his fingerprint to authenticate his identity by presenting his finger to a fingerprint verification system, which prior to that, he has already registered for such a service. The fingerprint verification system will then produce a number corresponding to the confidence level as to whether the person is the same as the person registered in the system. In other words, the fingerprint verification system produces the level of certainty that the person is who he claimed he is, called the matching score. When this number is added to the UIN, the new number is called the biometric identification number (BIN).The maximum achievable matching score (AMS), corresponding to 100% confidence that the person is who he claimed he is, can be any number, and need not necessarily be 100, such as 10,000. Similarly, a minimum matching score (IMS) can also be assigned to the system. To increase the security, a time stamp and a random key are added to the key. FIG. 4 illustrates the format of the SACK key, where the fields are as follows:

A1: Scramble Function Key.
A2: Random Key
A3: Time Stamp
A4: UIN
CS: Check Sum

Where A1 is the Scramble Function Key, A1 is not encoded. A1 is used to select which Scramble Function (such as shifts, rotates, add constant or etc) and which bit or byte is associated with which data type in order to scramble the following fields (A2-A4) for security reason. A2 and A3 are a Random Key and a Time Stamp respectively which were discussed in the previous section. CS is the check sum of the whole key to avoid any transmission error. A4 is the UIN.

An example of UIN is shown below:
Unique personal identification number: 2 345 678 988 011 009
Maximum matching score: 10 000.
Minimum matching score: 2500
Maximum BIN: 2 345 678 988 011 009+10 000=2 345 678 988 021 009
Minimum BIN: 2 345 678 988 011 009+2500=2 345 678 988 013 509

Since a user does not know the UIN, the BIN will also not be known to the user. Similarly, the user need not remember this number as well. The UIN will be kept by the computer storage medium of the company such as the security server 5 that issues it and the user. For example, when a user is interested to use the system, he will register for the service, where his biometrics such as fingerprint will be obtained. The issuing company stores the UIN and the fingerprint template in a smart card 1a which is then given to the user. For better security, the UIN can be changed every time the system is used. In order to change the UIN every time, the security server 5 and the remote client machine (smart card 1a or client computer 2) should have a security applet (e) or process, to manage the change of UIN. The server sends a new encrypted UIN to the remote client machine. The client machine decrypts the UIN and appends it to the old UIN. The upper half of the message length is the old UIN and the lower half the new UIN. Once the transaction has been done, the upper half of the UIN will be deleted and the lower half of the UIN will be moved to the upper half for next transaction to use. The following example shows how to generate and use UIN:

Number received: 2 345 678 988 011 009
Current UIN: 23 456 789
Next UIN: 88 011 009
Maximum matching score: 10 000.
Minimum matching score: 2500
Maximum current BIN: 23 456 789+10 000=23 466 789
Minimum BIN: 23 456 789+2500=23 459 289

In the next process, assuming the number received is 8 801 100 977 123 456
Current UIN: 88 011 009
Next UIN: 77 123 456

A reset code, such as null UIN can be used to reset the UIN for the case when a new device is installed or new user. Upon reset, the UIN will be ignored by both the client machine and the security server 5 and the client machine will use the new UIN from a new SACK generated by the security server 5.

Procedure of Identification of User Using Biometric

The following sequence occurs when the user tries to access the system.

(3.1) User inserts the smart card 1a to the card reader 1.
(3.2) Client computer 2 prompts for password or personal identification number (PIN).
(3.3) User inputs his password or PIN at client computer 2.
(3.4) Client computer 2 prompts for fingerprint.
(3.5) User places his finger on the sensor 3.
(3.6) Client computer 2 acquires the fingerprint and extracts the fingerprint template.
(3.7) Client computer 2 provides the PIN and fingerprint template to the smart card 1a.
(3.8) Smart card 1a matches the fingerprint against its stored template 11.

(3.9) Matching applet (a) requests the UIN from the security servers 5 or from the smart card 1*a*.

(3.10) If the matching score obtained is valid (i.e. the matching score obtained is between the IMS (minimum matching score) and the AMS (maximum matching score), the matching score obtained will be added to the UIN, to obtain the biometric identification number (BIN).

Example: Obtained matching score=4500
BIN=2345 678 988 011 009+4 500=2345 678 988 015509

(3.11) If the fingerprint matches below the IMS or above the AMS, a random number above the AMS will be added to the UIN to obtain the BIN.

Example: Obtained matching score=100
Random matching score generated=18 000
BIN=2 345 678 988 011 009+18 000=2 345 678 988 029 009

(3.12) Smart card 1*a* will combine the PIN and the BIN, encrypt them and send them to the client computer 2, which will then send to the transaction server 6. Other information, such as name of the user etc. can be included in the message sent as well. The transaction server 6 also can compute the SACK key as well.

(3.13) Transaction server 6 will match the PIN and subtract the UIN from the BIN to obtain the matching score (MS). There are 6 possible cases as follows:
a) PIN matches and MS is within the possible score (IMS<=MS<=AMS)
b) PIN matches but MS is outside the possible score
c) PIN does not match but MS is within possible score
d) PIN does not match and MS is outside the possible score
e) PIN matches and MS=0
f) PIN does not match and MS=0
(Note: if the transaction applet (d) is not enabled, that means login failed from the smart card 1*a* side and the transaction is terminated here.)

(3.14) From the above results, corresponding decision can be made.
Example: For case (a), full access is granted
For case (b), limited access is granted (or user tries again)
For case (c), limited access is granted (or user tries again)
For case (d), the smart card 1*a* is retained.
For case (e) it is treated as credit card with password protection.
For case (f), it is treated as normal credit card.

(3.15) The transaction server 6 will then send the decision to the smart card where the smart card will act according to the decision obtained.

The UIN can include an identifier which identifies the organization, such as the bank code. Similarly, the UIN can incorporate authentication results from more than one biometric parameters and include together the type of biometrics used and the biometrics system provider. Another alternative is to attach these numbers to the encrypted message as a header or footer. These numbers need not be encrypted.

Including the identifier code to the biometrics system has the following advantages:
1. The company that issues the smart card need not be tied to a single biometrics system provider. Any smart card that complies with the protocol specified by the issuing company can be used.
2. The user can select which biometrics he is comfortable with.
3. The issuing company need not keep track of all the biometrics used and implement the matching of the biometrics in the server. As such the BIN allows a mix and match of the biometrics system.
4. The BIN is similar to PIN system in use today, and as such, the issuing company can easily upgrade the current transaction server 6 with existing PIN system in use to incorporate the biometrics feature.

It is also possible to implement automatic selection of the most secure or suitable way of authenticating the identity of the user. The mode of authentication includes the type of biometrics used or password etc. There is a unique number, the authentication device identity number, assigned to each type of authentication mode. The client computer 2 will identify all the available authentication modes and store these device identity numbers. On the security server 5 side, the server system ranks the confidence level or security of each of these authentication modes. The ranking is usually dependent on the choice or preference of the user. Such a ranking is done by providing a table of entry in which the device identity number is stored. The entry at the top of the table corresponds to the most confident means of user authentication while the bottom most entry is the least confident means. When identity authentication is needed, the client computer 2 will indicate the available authentication mode by providing the authentication device identification numbers available. The security server 5 will then choose from these entries, the most appropriate means to authenticate the identity of the user.

The protocol is as follows:
(4.1) Security server 5 has a table of entry to rank the confidence level of the authentication modes accepted by the company.
(4.2) When the client computer 2 is used, an indicator of the available authentication mode will be sent to the security server 5.
(4.3) Security server 5 decides the type of authentication mode to be used and send a reply to the client computer 2.
(4.4) The client computer 2 obtains the command and executes the required authentication mode to be used to identify the user.
(4.5) The security server 5 then matches the response from the data collected and processed by the client computer 2 and smart card 1*a* in order to authenticate the identity of the user.

Distributed Remote Execution Manager Protocol

A protocol for fingerprint matching on the smart card 1*a* with the assistance from the client computer 2 has been presented. Now the details of how the smart card 1*a* executes the functions in parallel with the client computer 2 will be discussed.

Conventional Smart cards have limited resources such as limited memory (RAM/EEPROM), processing power (8-bit/16-bit) and speed (less than 15 MHz). The data transfer rate from client computer 2 to smart card 1*a* is slow as well. A Distributed Remote Execution Manager Protocol is discussed below which allows shared execution while overcoming the problem of low data transfer rates. This protocol is described in the context of the above specified remote authentication process but is also suitable for other computing devices with low computing power and with a slow communication link. The architecture supporting the protocol is able to scale up to multiple remote devices to request remote execution or multiple servers to manage requested processes.

Distributed Computing Architecture

FIG. 5 shows a simplified architecture of multiple-processing units.

Assuming that Processing Unit 1 (PU1) has much more computing power than Processing Unit 2 (PU2). PU1 and PU2 are client computer and Remote Device (Device with lower processing power such as smart card or Personal Digital Assistant) respectively. The client computer PU1 performs processing of tasks. The remote device PU2 requests the client computer PU1 to execute tasks. Each processing unit has a copy of a task table holding details of tasks. FIG. 6 is an example of the task table.

In the task table, the first column contains the names of the objects and their functions. The second column contains the Object ID and Function ID. All names are in ASCII format. Object ID can be a 32-bit signed integer and Function ID can be a 16-bit signed integer. EOT stands for End Of Table that can be a 16-bit signed integer. EOT equals to −1. The third column and fourth column of the task table are only for the client side (PU1). The remote device (PU2) does not have columns 3 and 4. Column 3 is the parameters table. It contains the type casting of parameters. Column 4 contains the function/object entry point that is the starting address of the function or object. The number of objects in the task table is not limited, but programmer should aware of the memory size of the remote device (PU2) to avoid memory overflow exception. The task table is a mapping of the function's/object's name to the ID number. A Distributed-Object Execution Manager (D-OEM) executed on the remote device (PU2) uses this task table to notify a manager D-OEM on the client side PU1 (D-OEM_client) which task (object and function) should be executed. The D-OEM_client on the client side PU1 executes the function by mapping the ID to the starting address of the function using the task table.

Figure 7:
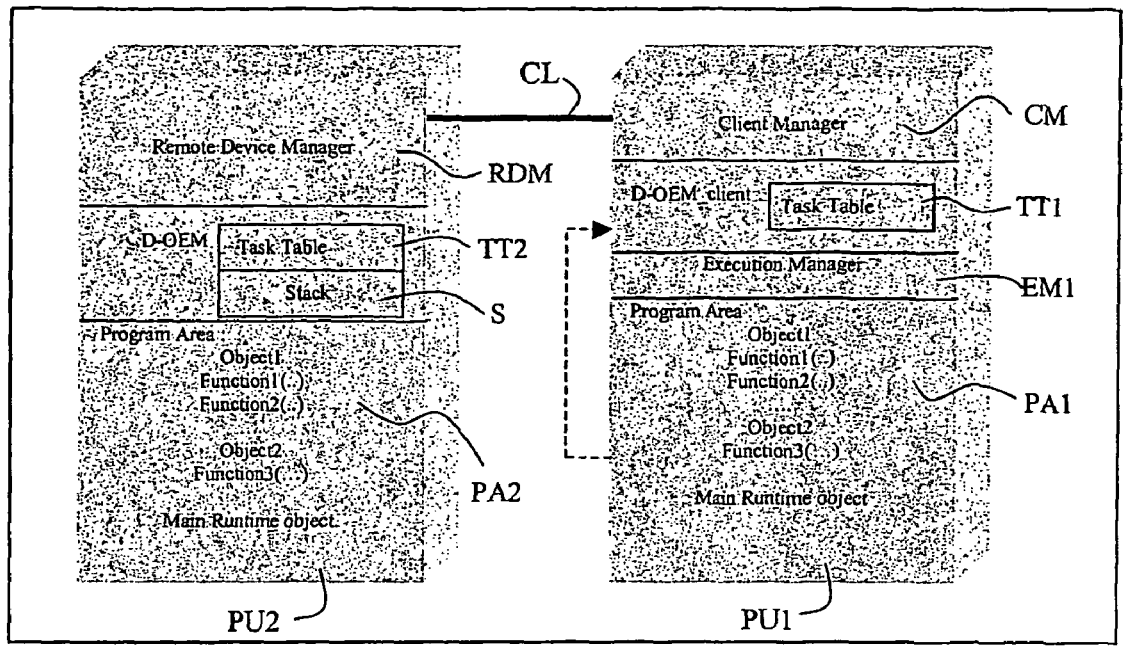
FIG. 7 illustrates a simplified architecture for distributed computing.

FIG. 7 is a schematic diagram showing the architecture of Distributed Computing. Dynamic binding is used to initialize all the entries of the task table in PU1 and PU2, that is the function entry point is determined during runtime. The client processing unit, PU1 has been divided into 4 levels. The first level is the Client Manager (CM) that handles communication over the communication channel CL denoted by a solid black line in FIG. 7. The second level is the D-OEM_client. The task table TT1 is stored inside the D-OEM_client. The third level is the Execution Manager EM1 which controls the execution of functions. The fourth level is the program area PA1. All functions and objects are stored in this level.

The remote device unit PU2 has a similar structure but in place of the Client Manager CM it has a Remote Device Manager RDM, and it does not have an Execution Manager. Instead the D-OEM in PU2 has a stack S to handle the return value of the function. The details of using this stack will be discussed later.

Figure 7A:
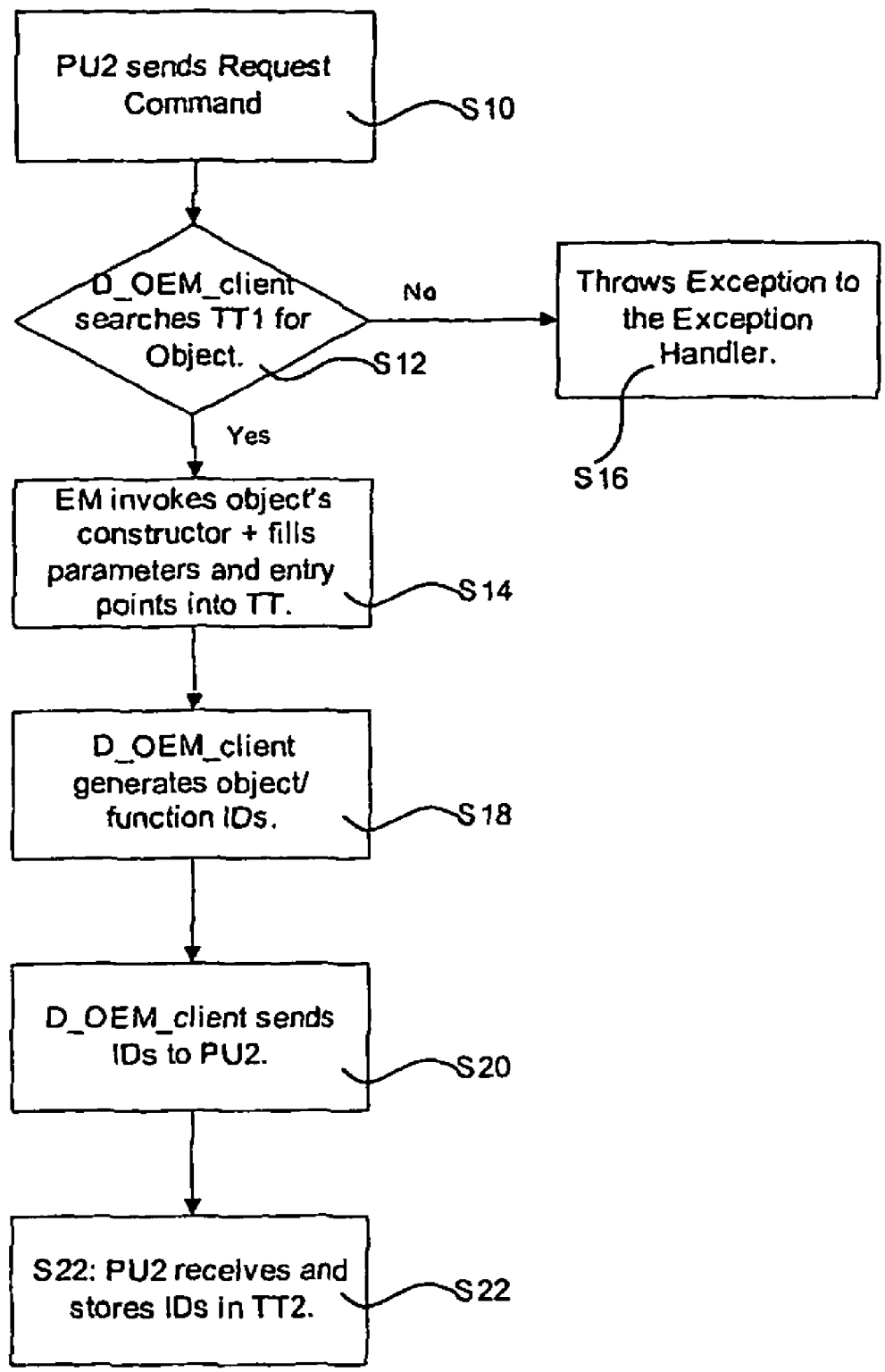
FIG. 7A is a flow diagram illustrating the procedure for initializing the task table.

Before initialization of the task tables, all the entries in the task tables except the Object Name column are empty. Before the remote device PU2 calls the function or object in the local client PU1, the D-OEM should initialize the task tables in both client PU1 and remote device PU2. The steps of FIG. 7A show the method of initialising the task table.

Figure 8:
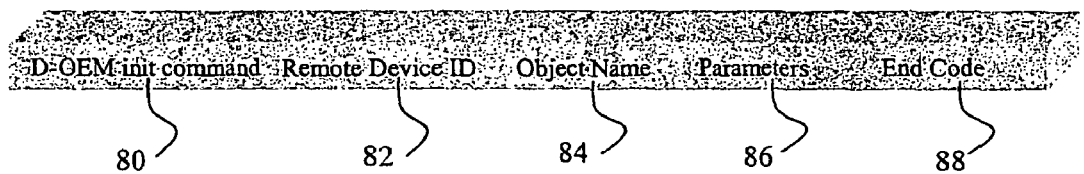
FIG. 8 shows the format of an Initialization_Of_Object command.

Step S10 Remote device PU2 sends a request command (Initialization_Of_Object) TT1 to the client PU1. The format of the Initialization_Of_Object request command is shown in FIG. 8.

Step S12 D-OEM_client searches the object name in the task table TT1.

Step S14 If D-OEM_client has found the object in the task table TT1, D-OEM_client will call the Execution Manager EM1 to invoke the object's constructor in order to initialise all the object's variables and functions. Execution Manager EM1 computes all parameters and entry points and it fills these entries into the task table (column 3 and 4) TT1.

Step S16 If D-OEM_client cannot find the object with the given name, the D-OEM_client will throw an exception to the system and terminate the process.

Step S18 Once the Execution Manager EM1 finishes the construction of the object, the D-OEM_client will generate all the IDs for the public functions, protected functions and the object itself. The D-OEM_client will fill the IDs into the task table TT1 (column 2).

Step S20 D-OEM_client sends the IDs in column 2 to the remote device PU2.

Step S22 The remote device PU2 receives the IDs and saves the entries to the local task table TT2.

The object can be initialized at any time, as the system needs to use the object. An array of objects can be used, as the D-OEM will generate multiple copies of task table TT2 for the system to call different objects. The details of generating the IDs will be discussed later. Once the code on the remote device PU2 has been terminated, all the entries in the task tables will be flushed.

We refer now to FIG. 8, which shows the format of the initialization-Of-Object command. The first field is the Remote Device ID 82. For smart cards, this ID can be the smart card ID. For mobile device with network support, this ID can be the IP address or MAC address. The D-OEM init command 80 is a unique binary command to instruct the D-OEM_client to perform remote object execution initialization. The Object Name 84 is the name of object in ASCII format. The parameters 86 are the initial value for construction of object. The End code 88 indicates the end of transmission.

Execution of a Remote Function and Synchronization

Figure 9:
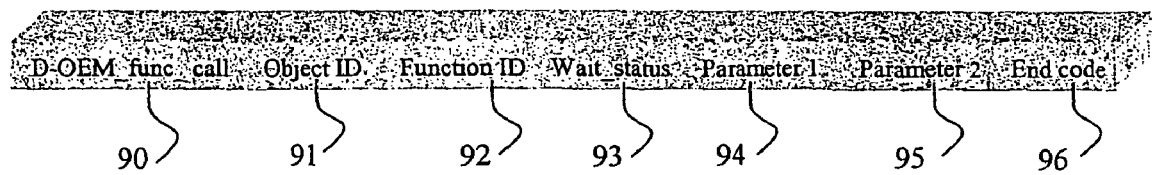
FIG. 9 shows the format of a command string.

In order to execute a remote function, the remote device PU2 needs to use its D-OEM to call a function and run it on the client computer PU1 side. Here is an example for the case where the remote device PU2 needs to call function1 that is the member function of object1:

Return value=*D__OEM*.execute("object1","function 1",wait_status,para1,para2, . . . );

D-OEM is the static base object. This object can be a dynamic object as well if the local function or object creates or inherits its own copy of D-OEM object. The function execute( . . . ) is the public member function of D-OEM. This function starts the function remotely on the client computer PU1. The first parameter is the name of the object. The second parameter is the name of the function. The third parameter is the type of wait state for synchronization. If the next function does not need the return value to execute and it can execute with this function concurrently, no_wait can be used to perform concurrent processing. Otherwise, the system waits for the response from the remote process. The range of time to wait for the remote procedure response is from 1 to 65535 (for the case of 16-bit unsigned integer). Zero stands for no_wait. The unit is in milliseconds. If the process cannot receive any response after timeout, a timeout exception will be thrown to the D-OEM. The other parameters (para1, para2, . . . ) are the parameters of function1. The D-OEM pushes the reference of the return value, Object ID and Function ID on the stacks. The stack is used for handling the return parameter. The D-OEM encodes the parameters to a command string (FIG. 9) and sends this string to the remote device manager RDM. The D-OEM looks the Object ID 91 and Function ID 92 up from the task table TT2. In FIG. 9, the command string has only two parameters (Parameter 1 94 and Parameter 2 95). The number of parameters depends on the function itself. Hence, the string can contain any number of parameters (not necessarily two as shown in FIG. 9).

This command string is sent to the remote device manager RDM. Then, the remote device manager RDM will send it to the client computer PU1 through the communication link CL. Any on-device cryptographic engine can be used to encrypt the string for secure data transfer. Once the client computer PU1 receives this command string, it will send it to the client manager CM. The D-OEM_func_call 90 is the binary command to indicate that the remote device PU2 requests a remote function call. The D-OEM_client decodes the string and it uses the task table TT1 to look up the software entry point of the object and function. The D-OEM_client passes the entry point and all the function's parameters to the Execution Manager EM so as to start the function. The reason for using an Execution Manager EM is the function can be a normal function or a thread. If the function is a thread, the Execution Manager EM will perform synchronization for the remote device PU2. The remote device PU2 can virtually control the remote thread directly. Once the function has been terminated, the function sends back the return value to the D-OEM_client (the dash line in FIG. 7). The D-OEM_client passes the return value to D-OEM via Client Manager CM, communication link CL and Remote Device Manager RDM. FIG. 10 shows the format of the return parameter from the client.

The D-OEM on the remote device PU2 checks the header of the return parameter. D-OEM_return_param 100 indicates this binary string contains the return parameter of the function. D-OEM only accepts the binary string with valid header. The D-OEM searches the reference of the return object by the Object ID 102 and the Function ID 104 in the stack S. Then, D-OEM will save the return value to the variable and push the variable on the stack S. The Type 106 indicates the type casting of the return value. The fifth field contains the actual Return Value 108 of the function. The End code 110 indicates the end of string.

Synchronization of concurrent functions is necessary. If the wait_status is set to no_wait, the D-OEM on the remote device PU2 will need to do extra procedures for synchronization. A synchronized( . . . ) function can be used if the program needs an explicit synchronization. Consider the following fragment of Java code:

```
1: r_value = D_OEM.execute("object1", "functional1", no_wait, para1, para2);
2: coef = calc(input);
3: result = coef * return_value;
. . .
```

The first line calculates the r_value. The second line calculates the coef. Both lines do not have any dependence, therefore, they can execute at the same time. The first line is executed on the client computer PU1, and the second line is executed locally, i.e. in the remote device PU2. However, all return values are needed to calculate the result in line 3. If the function in line 1 has not finished the computation but the function in line 2 has finished the computation (in other words, coef is ready to use but r_value is not ready yet), the function in line 3 will encounter an error provided that line 3 executes without any waiting for the calculation of r_result. Hence, it is necessary to perform synchronization in this case. Consider the following code fragment.

```
1: r_value = D_OEM.execute("object1", "function1", no_wait, para1, para2);
2: coef = calc(input);
3: D_OEM.synchronize("object1", function1", timeout);
4: Result = coef * return_value;
. . .
```

An extra line is added in the code fragment. The function in line 3 handles the synchronization. The function synchronize ( . . . ) is a public member function of D-OEM. This function forces the system to wait until the variable (r_value) receives the return value from the client computer PU1. The first two parameters are used to identify which function has been called that needs to perform synchronization. The third parameter indicates the maximum timeout in milliseconds. If D_OEM object encounters any timeout, an exception will be thrown out to the system. The remote device manager RDM catches the exception and then handles the error. Once the return_value is received, the system will execute the next line to calculate the result. The following procedures show how to perform synchronization by the D-OEM.

(5.1) Starts synchronization method and reset the timer.
(5.2) Checks the timer value, if the value is equals to timeout, an exception will be thrown and the synchronization method will be aborted.
(5.3) Checks the D-OEM commit buffer has received any return parameters. If any valid parameter belongs to the function, synchronization method will be terminated and the data will be sent back to the variable (r_value).
(5.4) Loops back to step 2 to continue wait function.

Generation of Object ID and Function ID

Since this is a distributed computing architecture, the communication can be any kinds of communication (wired or wireless). It is possible to connect multiple remote devices to a single client computer PU. In this case, the client computer PU needs more computing power to cope with multiple remote devices. Hence, the processing unit can be a high performance server. Regardless of whether the system contains single client or multiple-clients, the method of generating the ID and the protocol of handling multiple requests are the same.

Figure 12A:
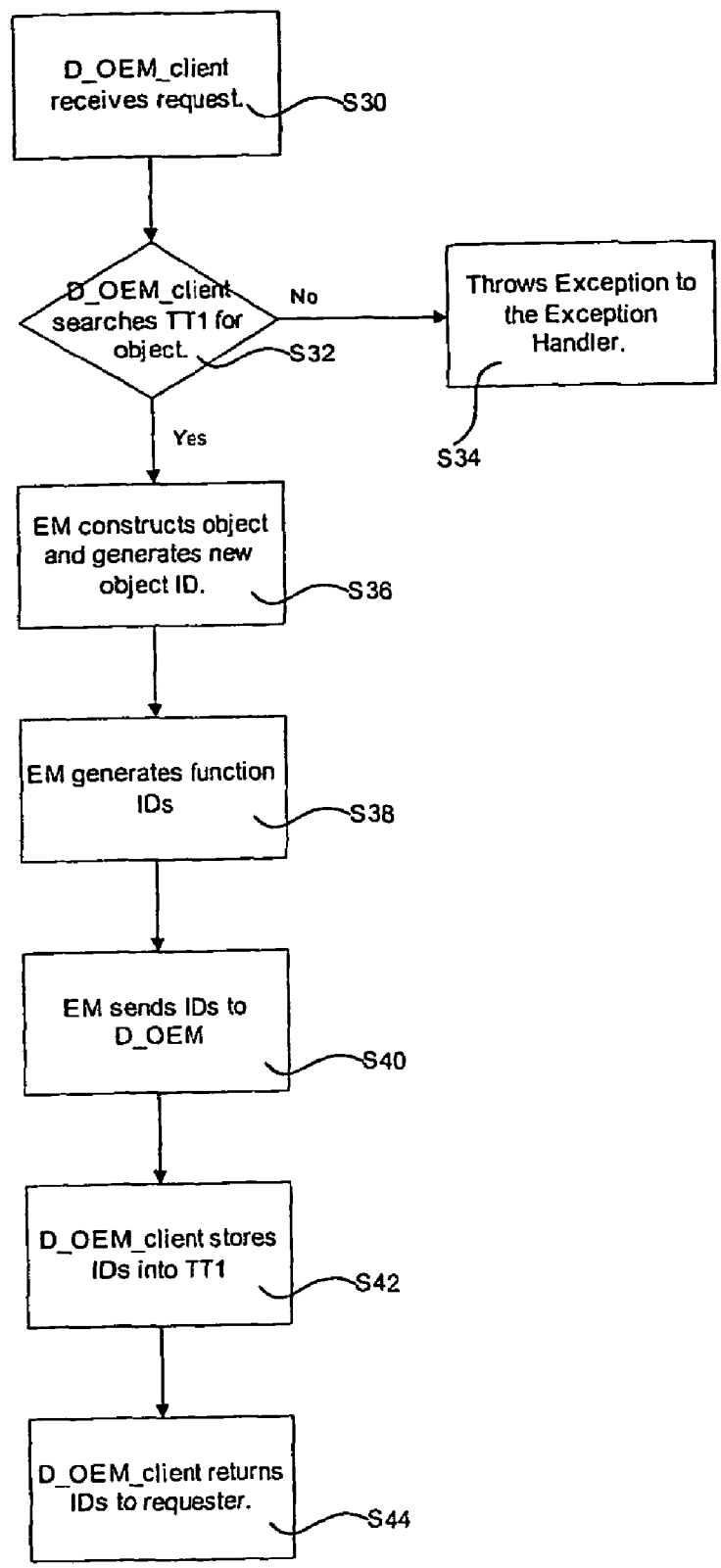
FIG. 12A is a flow diagram of the procedure for initializing a software object and its member function.

FIG. 12 shows two remote devices RD1, RD2 connected to a single client computer PU. Each remote device requests the client computer PU to execute some objects. These objects may or may not be identical processes. No matter which process or object is requested by the remote device, the execution manager needs to assign a unique ID to the object and its member functions. In order to generate unique ID, a separate task table for each remote device will be generated. In the case a 24-bit counter is used to generate all Object IDs and 16-bit counter to generate all Function Ids, then each member function's ID is 48-bit (16-bit+32-bit). Even if there are lots of remote devices requesting concurrent tasks at the same time, it is not easy to overflow the counter and causes duplicated ID. For the case the Object ID is a 32-bit integer, the object counter can only generate a 24-bit ID. The last 8 bits are reserved for a server ID in a multiple-server environment. Multiple-server environment will be discussed later. In this case, the last 8 bits are all set to zero. The execution manager uses the steps shown in FIG. 12A to initialize a software object and its member function.

Step S30 D_OEM_client receives the request from one of the remote devices (Initialization_Of-Object).

Step S32 D-OEM_client searches the object using the Object Name in the task table. If D-OEM_client cannot find any object with the given name, an exception will be thrown (Step S34). Otherwise, object construction (Step S36) will be performed. The Execution manager constructs the object and requests a new Object ID from the Object ID counter. Then, the manager will add one to the counter for next object.

Step S38 Execution Manager generates all function IDs using Function ID counter for the public and protected member functions of the object.

Step S40 Execution manager sends all IDs back to D-OEM_client.

Step S42 D-OEM_client checks the existence of the task table that belongs to particular remote device. If it does not exist, a new copy of task table with the remote device ID will be created. Otherwise, D-OEM_client appends the entries to the existing table. If the client computer PU connects to multiple remote devices, a separate task table will be generated for the specific device that sent the Initialization_Of_Object.

Step S44 D-OEM_client sends back all IDs to the requester.

In Step S42, if only one remote device RD1 is connected to the client, only a single copy of the task table will be generated. For multiple devices, each device has its own copy of task table. FIG. 13 shows the binary string that encodes the Object ID and Function IDs.

The D-OEM_client sends this string to the client manager. The client manager knows the path of sending back this binary string to the correct remote device. Once the remote device receives this string, it inspects the Remote Device ID of that remote device. If the ID is correct, it will send this string to the D-OEM. The D-OEM decodes all IDs and stores these IDs in the task table. The Number of IDs indicates the total number of ID (including the Object ID) in the string.

Using Distributed Computing to Perform Load Sharing for Fingerprint Matching on Smart Card It is very time consuming to perform a full matching on smart card 1a or remote device computer with low processing power. To overcome this problem, a load sharing mechanism by a more powerful local client computer 2 can speed up the processing time of the fingerprint matching. There follows a discussion of using Distributed Remote Execution Protocol to perform load sharing for the fingerprint matching discussed earlier.

Figure 13A:
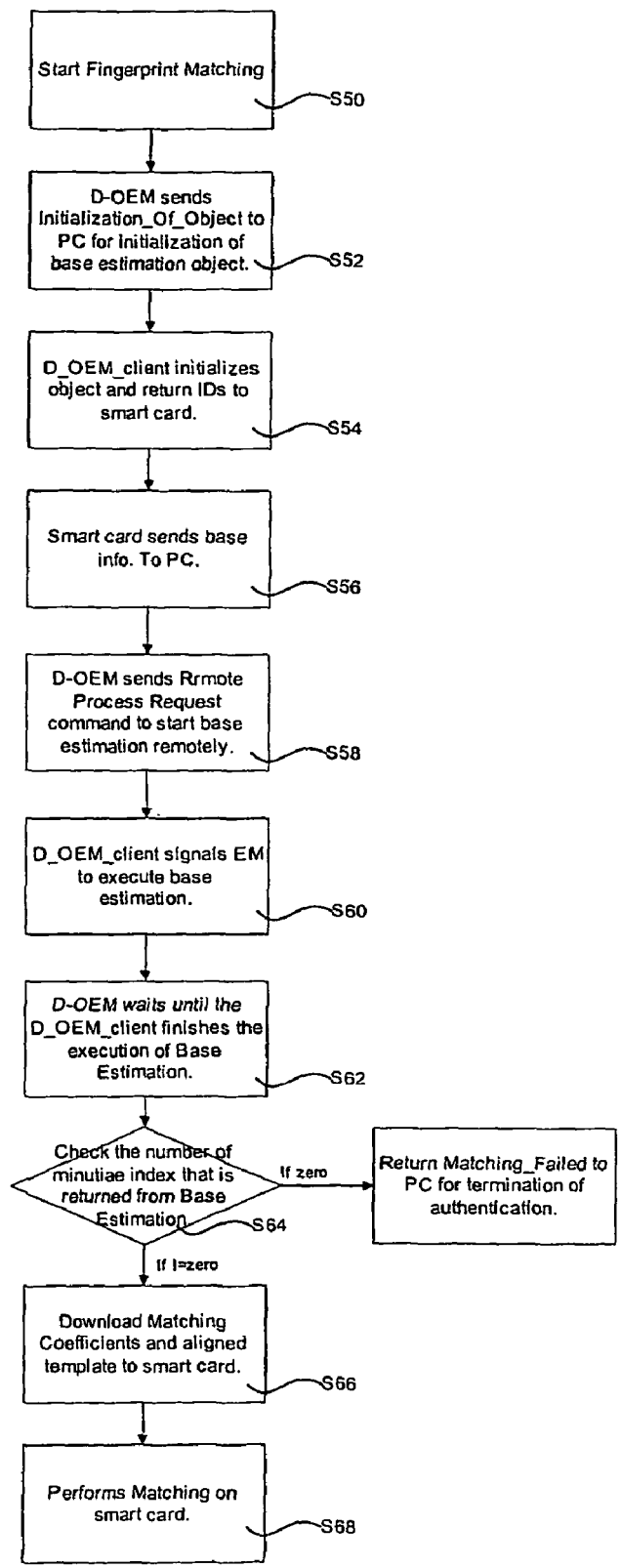
FIG. 13A is a flow diagram illustrating the procedure for load sharing a fingerprint matching operation.

Apart from the minutiae detection, the minutiae-based matching algorithm discussed earlier can be divided into two parts, the base finding (local stage) and minutiae matching (global stage). The base finding procedure is to find the best base minutiae to align two different fingerprint templates. The base finding procedure computes some parameters that are necessary for the alignment of two templates, and then passes these parameters to the matching stage so as to determine if the input fingerprint is a match or not. However, the base finding section is computationally intensive. If that part is computed by the smart card 1a, it will take more than one minute to get the matching result. In order to increase the speed, the client computer 2 does part of the computation. The client computer 2 acts as a co-processor for smart card 1a to perform verification. As discussed earlier, this in no way compromises the security as the base finding section only handles a very small subset of the fingerprint minutiae. The steps of FIG. 13A illustrate an example of how to use Distributed Remote Execution Protocol to perform load sharing for fingerprint matching on smart card 1a.

Step S50 Starts fingerprint matching.

Step S52 The D-OEM on the smart card 1a sends Initialization_Of-Object to the client computer 2 for initialization of the base estimation object.

Step S54 The D-OEM_client at the client computer 2 initialises the objects via execution manager and sends back the Object ID and Function IDs back to the smart card 1a.

Step S56 Smart card 1a sends base information to the client computer 2.

Step S58 The D-OEM of the smart card 1a sends a Remote Process Request Command to start base estimation remotely on the client computer 2.

Step S60 The D-OEM_client signals the Execution Manager to execute the base estimation routine.

Step S62 Smart card 1a waits until the client computer 2 has finished the Bases Estimation.

Step S64 If the number of minutiae index is zero from the Base Estimation, the smart card 1a will stop fingerprint matching and return matching-failed to client computer 2.

Step S66 Smart card 1a downloads the pre-matching coefficients and the aligned input fingerprint template.

Step S68 Performs final matching on smart card 1a.

Steps S54 and S66 use the protocol which has been mentioned above to transmit matching information between smart card 1a and client computer 2.

Process Execution via Multiple Processing Units

The scenario which has been discussed in the above sections, is simple peer-to-peer communication and processing: that is a remote device 200 with lower processing power requests a client computer 202 to handle the processing. However, if some of the processes are not secure to execute on the client computer 202, or the client computer 202 is not able to process the code as it is too computationally intensive, then a more powerful processing unit such as multiprocessor server 204, 206 will be used to help perform the execution. Consider FIG. 14.

Figure 14:
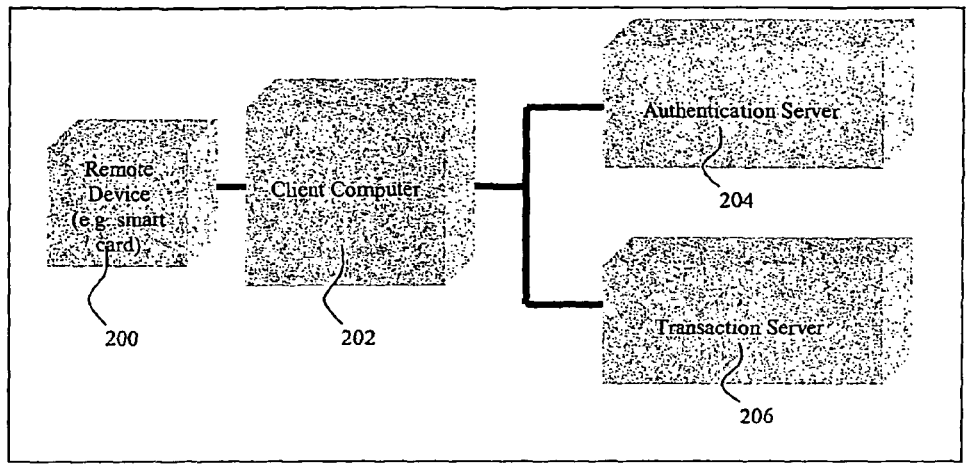
FIG. 14 shows a system incorporating multiple processing units.

In FIG. 14, a remote device 200 is connected to the client computer 202. If the client computer 202 is just a terminal with limited processing power, the client computer 202 will not be able to help the remote device 200 to perform load sharing. Moreover, if the client computer 202 is a public computer and the network server does not have any trust relationship with this client computer 202, the execution of the authentication procedures that has the intention of performing load sharing with the remote device 200 is not secure at all. Therefore, for low performance client computer 202 or untrustworthy client computer 202, the load sharing can be performed on the server side. The client computer 202 acts as a communication bridge between the remote device 200 and the servers 204, 206.

Figure 15:
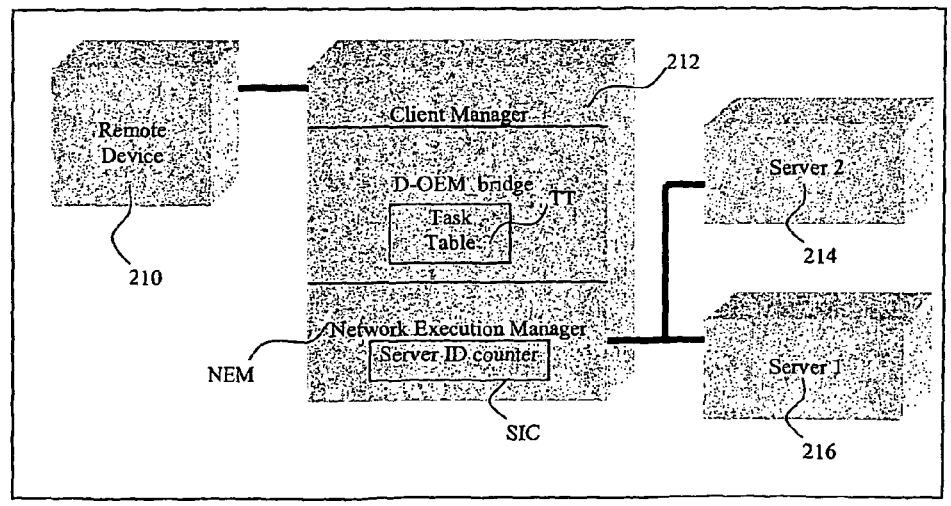
FIG. 15 illustrates the architecture of a distributed object execution manager bridge.

In FIG. 14, two servers 204, 206 are connected to the client computer 202. If the remote device 200 needs to execute some fingerprint authentication process, the remote device 200 will start a remote process request on the authentication server 204. Similar architecture can be used as mentioned in the earlier section. A D-OEM on the remote device 200 can be used to request for remote processing and a D-OEM_client on the authentication server 204 can be used to manage the processing of function/object. For the client computer 202, a D-OEM_bridge is used to manage the bridging procedure. The structures and the commands of D-OEM and D-OEM_client are the same as the original format discussed earlier; no modification is necessary for this new environment. The D-OEM_bridge has similar architecture to the D-OEM_client. However, it does not have execution manager and the program area. It has the Network Execution Manager instead. FIG. 15 shows the basic architecture of the D-OEM_bridge.

Figures 16, 17:
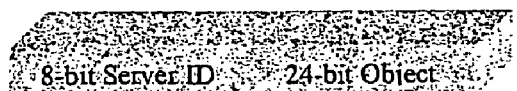
FIG. 16 is an example of a task table in the distributed object execution manager bridge.
FIG. 17 shows the format of an object identifier in a multiple server environment.

The D-OEM_bridge has a client manager executed on the client computer 212 to handle the communication between the remote device 210 and the client computer 212. It has a Task table TT as well. However, only the first two columns, Object Name and Object ID are the same as the table in FIG. 6. The third column is the network address of the servers. The address can be a URL or an IP address with an optional port number. FIG. 16 is the example of the task table in the D-OEM_bridge section. The Network Execution Manager NEM is used to monitor the process or thread synchronization between the remote device 210 and the servers 214, 216 (there can be more than 2 servers). The NEM connects to the servers 214, 216 via wired or wireless network. The role of NEM is to help the remote device 210 to start any remote process directly on the servers 214, 216. The NEM controls, translates and synchronizes data and network commands for the remote device 210 and the servers 214, 216. In fact, NEM is a software agent for managing distributed computing process with multiple servers.

Initialization of the D-OEM Object and Object ID

The initialization of the D-OEM object is similar to the method shown in FIG. 7A. However, in this case, the client computer 212 does not do any processing at all. The client computer 212 needs to know the method of accessing the servers 214, 216. Hence, D-OEM on the remote device 210 can notify the actual address either the URL or the IP address to the client computer 212. The following procedures describe the method of initialization of D-OEM-bridge and D-OEM_client object.

(6.1) D-OEM on the remote device 210 sends a request (Initialization_Of_Object) with a URL/IP address to the client computer 212.

(6.2) D-OEM_bridge receives this request. It sends this request to the server 214, 216 by the URL/IP address from the remote device 210.

(6.3) The D-OEM_client on the server 214, 216 initializes all objects and the task table.

(6.4) The server 214, 216 sends back the task table to the D-OEM_bridge.

(6.5) The NEM adds the Server ID to the Object ID.

(6.6) The D-OEM_bridge records the Objects IDs and URL/IP addresses in the local task table TT.

(6.7) The D-OEM_bridge sends the Object IDs to the remote device 210 to perform D-OEM initialization as mentioned above.

In procedure (6.5), the Object ID can be generated from different servers. Each server follows the procedure shown in FIG. 12A to generate all IDs. It is possible that different objects will have the same Object ID, provided that these two objects are initialized on different server. In earlier example, an 8-bit Server ID field has been reserved in the 32-bit Object ID. In FIG. 15, the Network Execution Manager NEM has a Server ID counter SIC. This counter SIC is used to generate a unique Server ID for each individual server. The following procedures show the method of assigning a new Server ID to the new location.

(7.1) The NEM receives the request the Initialization_Of Object command from D-OEM_bridge.

(7.2) The NEM checks the location whether is there any pre-assigned Server ID.

(7.3) If NEM has recently accessed to the address of the server, NEM will use the old Server ID in the NEM cache memory.

(7.4) If NEM did not have any recent access to the requested location for distributed execution, the NEM get a new ID from the Server ID counter. NEM increments the counter by one for next Server ID.

(7.5) NEM sends back the Server ID to the D-OEM_bridge to calculate the new Object ID.

The new Object ID is the combination of the Object ID from the server and the Server ID from NEM. FIG. 17 shows the format of a combined object ID. Each Object ID has a unique number in the task table to avoid incorrect invocation of the function. The NEM inspects for any Server ID that has been released by a terminated object. The NEM can recycle any used Server ID but lose the reference to the old object. For an 8-bit Server ID, the maximum possible server number is 256.

Execution, Synchronization and Return Parameter

The method for remote execution of an object and function is similar to the method described above, but with the client computer 212 acting as a bridge. All requests for remote processing are passed to the servers 214, 216 directly. The D-OEM_bridge looks up the URL/IP address from the task table TT and passes the command and all parameters to the servers 214, 216. The servers 214, 216 follow the method described above under the heading "Execution of a remote function and synchronization" to perform processing and synchronization of the object/function. The servers 214, 216 ignore the Server ID because this ID is only for the bridge to discriminate the ID from different servers. Once a server receives the Object ID, it will perform Logical-AND as shown in equation 6 for the case of 32-bit in order to get back the original 24-bit version of the Object ID. It uses this Object ID to look up the entry point of the function from the task table TT. The servers 214, 216 then executes the function described above.

$$\text{Server Object ID} = (D\text{-}OEM\_\text{Bridge Object ID}) \text{ AND } 0x00FFFFFF \qquad (6)$$

AND: Logical AND

For Synchronization, the remote device 210 waits for the response from the processing server. Once any of the servers 214, 216 completes the operation, it will pass the return parameters to the D-OEM_bridge. When the D-OEM_bridge receives the return parameter, it will notify the remote device 210 of the return parameters from the respective server. The D-OEM_bridge in fact acts as a communication bridge to pass all information between the remote device 210 and the servers 214, 216; thus allowing the remote device 210 to virtually command a direct communication to multiple servers. The D-OEM_bridge handles the procedures of accessing multiple servers.

The return parameter format is the same as that shown in FIG. 10. However, the only modification is the Object ID 102. Once the D-OEM_bridge receives the return parameter string from the server 214, 216, it will extract the Object ID 102. Since the Server ID field is empty in the Object ID 102, a Server ID assigned earlier for this server connection is added to the Object ID 102. Then, the updated Object ID 102 will be put back to the return parameter string and sent back to the remote device 210. The remote device 210 uses the function return address that is saved on the stack earlier to save the return value to the targeted memory location.

Network Execution Manager (NEM)

The architecture of the NEM which, in fact, is a software agent will now be described. The role of this agent is to start any remote execution on behalf of the remote device 210 at the server 214, 216. The following tasks are performed by the NEM:

(1) As communication controller to link together the remote device 210 and the server 214, 216.
(2) Translates the communication protocol between the remote device 210 and the server 214, 216.
(3) Handles network exception.
(4) Manages Server IDs for multiple servers.
(5) Buffers the requests to minimize network congestion.
(6) Acts as a Firewall to avoid illegal access.

Figure 18:
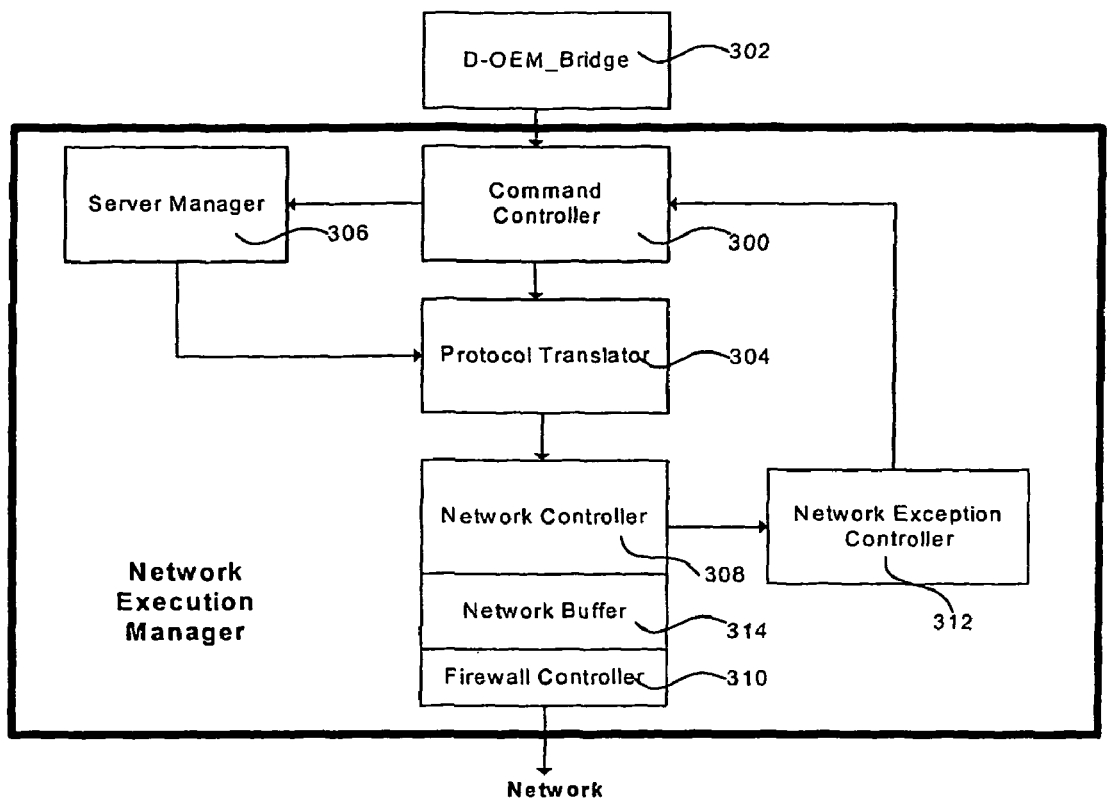
FIG. 18 is a schematic block diagram of a network execution manager.

FIG. 18 shows the basic structure of the NEM. It has a Command Controller 300 to handle the commands from the D_OEM_bridge 302. A Protocol Translator 304 manages the translation of the data and commands from one network to another network. For example, the smart card uses the ISO7816-4 format. Before entering the request to the network, the protocol should be translated from ISO7816-4 to TCP/IP for Internet connection. A Server Manager 306 manages the connection of the server and the Server IDs. A Network Controller 308 manages the connection to the network. It has a local network buffer to minimize the network congestion. A firewall 310 is used to avoid any illegal connection. In addition a Network Exception Controller 312 is used to cope with any network errors and reports any network exception that occurs to the Command Controller 300 directly. Distributed-Object Execution Manager (D-OEM)

Figure 19:
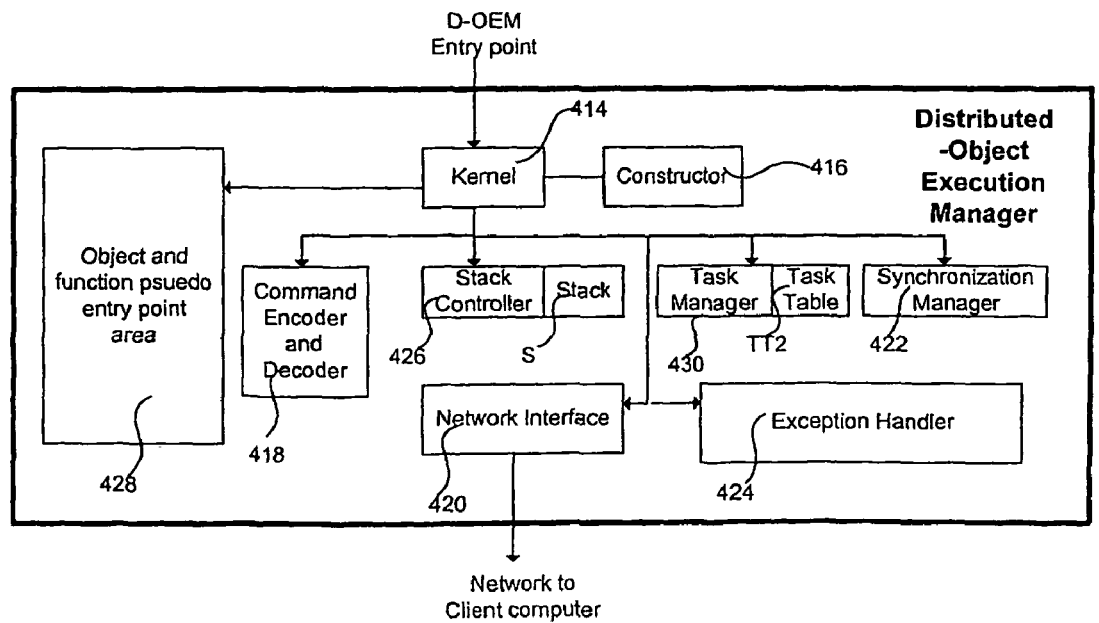
FIG. 19 is a schematic block diagram of a distributed object execution manager in a remote device.

D-OEM manages the remote execution request for the remote device 210. The remote device 210 sends a load-sharing request to the local client/server. If the client computer 212 can process the object/function, the D-OEM_client will execute the function locally by the Execution Manager. Otherwise, the D-OEM_bridge passes the requests to the server 214, 216 and performs execution on the server 214, 216 side. FIG. 19 shows the basic structure of D-OEM. The D-OEM has a Kernel 414 with single entry point. It has the privilege to access all resources within the D-OEM object. The D-OEM has an object's Constructor 416 to initialize all components inside the object. A Command Encoder and Decoder 418 synthesizes the D-OEM commands which were described above. A Network Interface 420 is a software interface that binds with the external network object for the purpose of establishing communication with the external parties. A Synchronization Manager 422 manages all synchronization requests. Exception Handler 424 manages all exceptions either from the remote functions or the local D-OEM exception. A Stack Controller 426 manages the return parameters of the function and the stacks. An Object and the function pseudo entry point area 428 is a descriptor of the remote process that the local function can perform a virtual call to the respective function/object. This allows the local function to call any of the remote functions as easily as calling a local function. The Kernel 414 does the actual remote process invocation. A Task Manager 430 controls the initialization of the remote objects and functions. It also manages the task table TT2 as well.

For the D-OEM_client, it is slightly different from the D-OEM, as shown in FIG. 20.

In FIG. 20, a basic structure of D-OEM_client is shown. It is similar to the D-OEM. However, all return parameters are sent back directly to the remote device 210. The parameters do not need to be stored in the D-OEM_client, hence the Stack Controller 426 is not required. The Execution Manager EM controls the execution of the function and thread. The Network Interface 520 receives the request command from the remote device 210. All commands are sent to the Kernel 514 for processing. The object initialization is done by the system. The other components have the same functionality as D-OEM. The Execution Manager EM manages the requested object or function that needs to be executed locally. Once the D-OEM_client decodes the executing command and gets the process entry point, the entry point will be passed to the Execution Manager EM for process execution. The detail of Execution Manager EM is discussed below.

For D-OEM_bridge, its role is to pass the commands and parameters between the server 214, 216 and the remote device 210. The structure is simpler than D-OEM and D-OEM_client.

FIG. 21 is the structural diagram of D-OEM_bridge. The D-OEM_bridge acts as a communication bridge between the remote device 210 and the server 214, 216. The Kernel 614 controls and initializes all components inside the object. The Task Manager 630 manages the task table TT2. A System buffer 632 stores the unfinished task for the kernel 614 to process later. An NEM bridge 634 is a software interface to the NEM. The NEM controls the higher-level network management as mentioned above.

Figure 22:
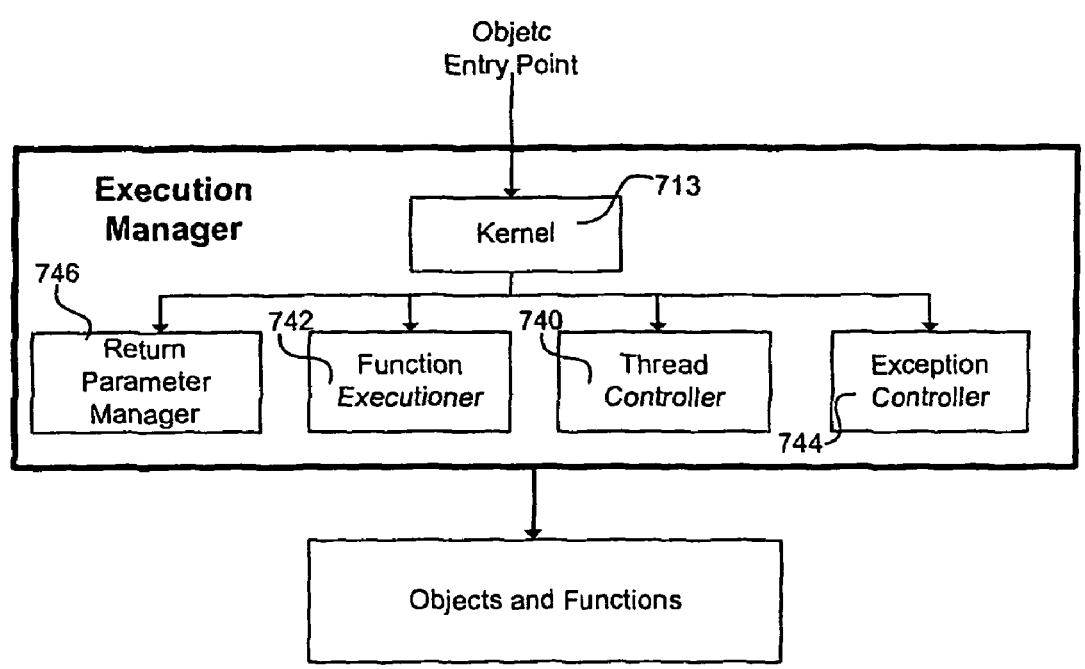
FIG. 22 is a schematic block diagram of an execution manager.

The Execution Manager EM is used to control the execution of threads and functions. FIG. 22 shows the structure of the Execution Manager. If the requested process is a thread, a Thread Controller 740 will manage all synchronization procedures. If the requested process is a function/object, a Function Executioner 742 will start and monitor the process execution. If there is any exception from either the function or thread, an Exception Handler 744 will handle the process execution. This Handler 744 tries to terminate any ill procedure so as to minimize the impact of the error to the other concurrent processes.

The invention claimed is:

1. A method of authenticating a user according to a biometric parameter of the user presented at an authentication device on a user-presented device on which is stored a biometric identification template divided into a secure portion and an open portion, the method comprising:
   transmitting to a client terminal data derived from said user biometric parameter at the authentication device;
   transmitting from a user-presented device to the client terminal only the open portion of the said biometric identification template held on the user-presented device, wherein the open portion is the portion containing data insufficient to construct a fake template that would allow an impostor to be incorrectly authenticated as a genuine user and comprises parameters of a predetermined number of unique features of the template;
   at the client terminal, implementing a first stage of a biometric identity authentication process between said derived data and said open portion to produce intermediate results, and transmitting the intermediate results of said biometric authentication process to the user-presented device, wherein said intermediate results comprise parameters for alignment of said derived data and said biometric identification template;
   at the user-presented device implementing a second stage of the biometric identity authentication process to complete the biometric identity authentication process using said intermediate results and said secure portion and issuing a biometric authentication result based thereon; and
   wherein the secure portion of the biometric identification template is the portion containing data unauthorized modification of which may cause an impostor to be incorrectly authenticated as a genuine user.

2. A method of registration of a user according to a biometric parameter of the user presented at an authentication device, the method comprising:

transmitting to an authorized client terminal data derived from said user biometric parameter obtained at the authentication device;

at the authorized client terminal, dividing the biometric identification template computed into secure portion and open portion, wherein the open portion is the portion containing data insufficient to construct a fake template that would allow an impostor to be incorrectly authenticated as a genuine user and comprises parameters of a predetermined number of unique features of the template;

transmitting from the authorized client terminal to a user-presented device both the open portion and the secure portion of a biometric identification template, storing the said template consisting of open and secure portions on the user-presented device, with the secure portion only accessible within the user-presented device and not externally; and wherein the secure portion of the biometric identification template is the portion containing data unauthorized modification of which may cause an impostor to be incorrectly authenticated as a genuine user.

3. A method according to claim 1, wherein the biometric parameter is a fingerprint.

4. A method according to claim 1, wherein the first stage of said biometric identity authentication process implemented at the client terminal comprises locating unique features using the data derived from the user biometric parameter and aligning them with said predetermined number of unique features from the identification template held on the user-presented device.

5. A method according to claim 1, wherein the second stage of the said identity authentication process implemented on the user-presented device is implemented using a local executable matching program stored on the device.

6. A method according to claim 1, wherein the first stage of the identity authentication process implemented at the client terminal is implemented using a client executable matching program.

7. A method according to claim 6, wherein the client executable matching program is stored on the user-presented device or the authentication device and is transmitted to the client terminal at the time of authentication.

8. A method according to claim 6, wherein the client executable matching program is downloaded by the client terminal from a remote memory at the time of authentication.

9. A method according to claim 1 wherein the authentication result is used to authenticate a user for authorizing a secure transaction.

10. A method according to claim 9, wherein the secure transaction is controlled by an executable transaction program stored on the user-presented device.

11. A method according to claim 1, wherein, when the authentication result indicates an adequate match, a first security access check key is constructed including the authentication result.

12. A method according to claim 10, wherein a second security access check key is requested and compared with the first security access key, the result of said comparison being used to enable the executable transaction program if it yields a positive authentication result.

13. A method according to claim 12, wherein the second security access check key is issued from a security server.

14. A method according to claim 13, wherein the first and second security access check keys each include a unique identification number.

15. A method according to claim 12, wherein the unique identification number contains a number obtained from a mathematical operation on a randomly generated number and the authentication result.

16. A method according to claim 15, wherein the randomly generated number changes at each time the number is used.

17. A method according to claim 16, wherein the changing random number is tracked by dividing the number into two portions, a first portion to be used as the current random number and a second portion to be used as the next random number.

18. A method according to claim 14, wherein the unique identification number contains a number that is remembered by the user.

19. A method according to claim 15, wherein more than one authentication methods can be used to obtain the authentication result, each being incorporated into the unique identification number.

20. A method according to claim 14, wherein the access is divided into several levels and wherein the level of access granted to a user is dependent on the confidence level of positive identity obtained from the unique identification number.

21. A system for authenticating a user according to a biometric parameter of the user, the system comprising:

a user-presented device on which is stored a biometric identification template divided into a secure portion and an open portion, wherein only said open portion can be transmitted out of the said device, wherein the open portion is the portion containing data insufficient to construct a fake template that would allow an impostor to be incorrectly authenticated as a genuine user and comprises parameters of a predetermined number of unique features of the template; and wherein the secure portion of the biometric identification template is the portion containing data unauthorized modification of which may cause an impostor to be incorrectly authenticated as a genuine user;

an authentication device operable to read biometric data derived from a user, and comprising means for communicating with the user-presented device and a client terminal;

a client terminal arranged to receive the said open portion of the biometric identification template held on the user-presented device and the biometric data derived from the user, and comprising a client processor operable to implement a first stage of a biometric identity authentication process between said derived data and said open portion to produce intermediate results, and to transmit the intermediate results of said biometric identity authentication process to the user-presented device, wherein said intermediate results comprise parameters for alignment of said derived data and said biometric identification template;

and wherein the user-presented device comprises a device processor operable to implement a second stage of the biometric identity authentication process to complete the biometric identity authentication process using said intermediate results and said secure portion to issue a biometric authentication result based thereon.

22. A system according to claim 21, wherein the biometric parameter is a fingerprint, and wherein the authentication device includes a fingerprint sensor.

23. A system according to claim 21, wherein the user-presented device comprises a memory in which is stored a local executable matching program for implementing the second stage of the matching process.

24. A system according to claim 23, wherein the memory on the user-presented device stores a client executable matching program which is transmitted to the client processor to implement the first stage of the matching process.

25. A system according to claim 21, which comprises a security server connected to the client terminal.

26. A system according to claim 25, wherein the security server holds a client executable matching program for implementing the first stage of the matching process.

27. A system according to claim 25, wherein the security server holds a security access check key requestable by the client terminal for enabling a transaction.

28. A system according to claim 21, which comprises a transaction server arranged to implement secure transactions and which is in communication with the client terminal so that the authentication result is usable to authenticate a user for authorizing a secure transaction.

29. A system according to claim 28, wherein the user-presented device stores an executable transaction program for controlling the secure transaction.

30. A system according to claim 28, wherein more than one authentication methods can be used to obtain the authentication result.

31. A system according to claim 28, wherein the access to the transaction server is divided into several levels and wherein the level of access granted to a user is dependent on the confidence level of positive identity obtained based on the results from the various authentication methods used.

32. A method of executing an operation using first and second processors, the method comprising:
storing in the first processor a first task table containing a plurality of process names with associated process identifiers, each associated with a process locator;
storing in the second processor a second task table containing said of process names and process identifiers;
identifying at the second processor a process to be executed and issuing a request to the first processor to execute said process;
locating said process using the process locator and executing said process at the first processor to generate a result; and
returning the result to the second processor;
wherein the operation being executed is a fingerprint-matching algorithm comprising a base minutiae finding process executed by the first processor and a minutiae matching process executed by the second processor,
wherein the base minutiae finding process is a first stage of a biometric identity authentication process implemented between data derived from a user biometric parameter and an open portion of a biometric identification template, wherein the biometric identification template is divided into the open portion and a secure portion, to produce intermediate results, said open portion containing a subset of minutiae data selected such that the content of the open portion is insufficient to construct a fake template that would allow an impostor to be incorrectly authenticated as a genuine user, the secure portion of the biometric identification template being the portion containing data unauthorized modification of which may cause an impostor to be incorrectly authenticated as a genuine user and said intermediate results comprise parameters for alignment of said data and said biometric identification template and are transmitted from the first processor to the second processor, and
wherein the minutiae matching process is a second stage of the biometric identity authentication process to issue a biometric authentication result using the intermediate results.

33. A method according to claim 32, wherein said process names include object names associated with respective object identifiers.

34. A method according to claim 33, wherein each object has associated therewith a plurality of functions each identified by function names and associated function identifiers in the first and second task tables.

35. A method according to claim 32, wherein the process locator identifies the starting address of a process in a program memory.

36. A method according to claim 32, wherein the second processor has significantly less processing power than the first processor.

37. A method according to claim 32, wherein the second processor is arranged to execute locally processes requiring less processing power than those executed by the first processor.

38. A method according to claim 32, wherein there are a plurality of second processors in communication with a single first processor, each second processor holding a respective task table, and the first processor holding a first task table including all processes identified by the task tables of the second processors.

39. A method according to claim 32, wherein a client bridge is connected between the first and second processors, the client bridge conveying said requests from the second processor to the first processor and returning the results from the first processor to the second processor.

40. A method according to claim 32, wherein the first processor is a client terminal and the second processor is embedded on a secure portable computing and data storage platform.

41. A method according to claim 32, wherein there are a plurality of first processors connected via a client bridge to one or more second processor and arranged to implement different subsets of the processes in the task table of the second processor.

42. A processing system comprising:
a first processor in which is stored a first task table containing a plurality of process names and process identifiers, each associated with a process locator;
a second processor in which is stored a second task table containing said process names with associated process identifiers;
the second processor including a distributed object execution manager for identifying a process to be executed and issuing a request to the first processor to execute said process; and
the first processor including a client distributed object execution manager for controlling the execution of said processes at the first processor, the results of execution of the processes implemented at the first processor being returned to the second processor;
wherein the first processor and the second processor are operable to execute an operation, the operation being a fingerprint-matching algorithm comprising a base minutiae finding process executed by the first processor and a minutiae matching process executed by the second processor,
wherein the base minutiae finding process is a first stage of a biometric identity authentication process implemented between data derived from a user biometric parameter and an open portion of a biometric identification template, wherein the biometric identification template is divided into the open portion and a secure portion, to produce intermediate results, said open portion containing a subset of minutiae data selected such that the content of the open portion is insufficient to construct a fake template that would allow an impostor to be incorrectly authenticated as a genuine user, the secure portion of the biometric identification template being the portion containing data unauthorized modification of which may cause an impostor to be incorrectly authenticated as a genuine user and said intermediate results comprise parameters for alignment of said data and said biometric identification template and are transmitted from the first processor to the second processor, and wherein the minutiae matching process is a second stage of the biometric identity authentication process to issue a biometric authentication result using the intermediate results.

43. A processing system according to claim 42, wherein the first processor includes a client manager for handling communications between the first and second processors.

44. A system according to claim 42, wherein the first processor includes an execution manager for handling the execution of processes.

45. A system according to claim 42, wherein the first processor comprises a program store for holding said processes, the process locator being used to identify the location of said processes in the program store.

46. A system according to claim 42, wherein the second processor includes a remote device manager for transmitting said requests to the first processor.

47. A system according to claim 42, wherein the second processor comprises a stack for holding results returned to it from the first processor.

48. A system according to claim 42, wherein the second processor includes a program store for holding said processes.

49. A system according to claim 42, wherein the first processor comprises a client terminal.

50. A system according to claim 42, which comprises a plurality of first processors, the system further comprising a client bridge for handling communications between the first processors and the second processor.

51. A system according to claim 50, wherein each first processor comprises a server.

52. A system according to claim 50, wherein the client bridge includes a network execution manager for transmitting requests from the second processor to the appropriate one of the first processors, based on a processor identifier in the request.

53. A system according to claim 42, comprising a plurality of second processors and a client bridge for connecting said second processors to said first processor.

54. A system according to claim 42, wherein the second or each second processor is embedded on a respective portable secure computing and data storage platform such as smart card.

* * * * *

UNITED STATES PATENT AND TRADEMARK OFFICE
CERTIFICATE OF CORRECTION

| | | |
|---|---|---|
| PATENT NO. | : 8,406,478 B2 | Page 1 of 1 |
| APPLICATION NO. | : 10/524057 | |
| DATED | : March 26, 2013 | |
| INVENTOR(S) | : Tai Pang Chen and Wei Yun Yau | |

It is certified that error appears in the above-identified patent and that said Letters Patent is hereby corrected as shown below:

On the Title page, Item 73

Assignee: Insert --; Singapore (SG)-- between Research Nanyang

Signed and Sealed this
Tenth Day of December, 2013

Margaret A. Focarino
*Commissioner for Patents of the United States Patent and Trademark Office*